US011334616B2

(12) United States Patent
Luigi

(10) Patent No.: US 11,334,616 B2
(45) Date of Patent: *May 17, 2022

(54) METHOD FOR MANAGING MULTIMEDIA FILES

(71) Applicant: VIRTUOUS CIRCLE SA, Lugano (CH)

(72) Inventor: Romano Luigi, Azzate (IT)

(73) Assignee: VIRTUOUS CIRCLE SA, Lugano (CH)

( * ) Notice: Subject to any disclaimer, the term of this patent is extended or adjusted under 35 U.S.C. 154(b) by 14 days.

This patent is subject to a terminal disclaimer.

(21) Appl. No.: 16/928,379

(22) Filed: Jul. 14, 2020

(65) Prior Publication Data

US 2020/0342021 A1   Oct. 29, 2020

Related U.S. Application Data

(63) Continuation of application No. 15/536,625, filed as application No. PCT/IB2015/059622 on Dec. 15, 2015, now Pat. No. 10,719,546.

(30) Foreign Application Priority Data

Dec. 16, 2014  (IT) .......................... MI2014A002157
Apr. 15, 2015  (IT) ........................ 102015902344341

(51) Int. Cl.
  *G06F 16/48*    (2019.01)
  *G06F 16/438*   (2019.01)
  *G06F 16/44*    (2019.01)

(52) U.S. Cl.
  CPC .......... *G06F 16/48* (2019.01); *G06F 16/4387* (2019.01); *G06F 16/44* (2019.01)

(58) Field of Classification Search
  CPC ....... G06F 16/48; G06F 16/44; G06F 16/4387
  See application file for complete search history.

(56) References Cited

U.S. PATENT DOCUMENTS

2002/0194608 A1   12/2002  Goldhor
2003/0236695 A1*  12/2003  Litwin, Jr. ......... G06Q 30/0201
                                                      705/7.29

(Continued)

FOREIGN PATENT DOCUMENTS

EP         1927925 A2     6/2008

OTHER PUBLICATIONS

Communication Pursuant to Article 94(3) EPC issued in European Application No. 15828759.9 dated Jan. 17, 2019, 7 pages.

(Continued)

*Primary Examiner* — Cam Y T Truong
(74) *Attorney, Agent, or Firm* — Fish & Richardson P.C.

(57) ABSTRACT

A method for managing multimedia files includes an operating step whereby at least one playback management object of one or several multimedia files is generated, said playback management object including at least one playback parameter of multimedia files, said operating step whereby at least one playback management object is generated including at least an operating step whereby said at least one playback parameter of multimedia files is generated. The method also comprises an operating step whereby at least one link between said playback management object and at least a first multimedia file is generated, the operating step whereby said at least one playback management object and/or said link are stored in a memory and an operating step whereby at least a first multimedia file or a plurality of multimedia files are played, as a function of said at least one playback parameter of said playback management object.

18 Claims, 12 Drawing Sheets

(56) References Cited

U.S. PATENT DOCUMENTS

| | | | |
|---|---|---|---|
| 2004/0264715 A1 | 12/2004 | Lu | |
| 2006/0288042 A1* | 12/2006 | Hsieh | G11B 27/329 |
| 2007/0058937 A1 | 3/2007 | Ando | |
| 2008/0222546 A1 | 9/2008 | Mudd et al. | |
| 2008/0250037 A1 | 10/2008 | Date et al. | |
| 2011/0054646 A1* | 3/2011 | Hernandez | G06F 16/632 |
| | | | 700/94 |
| 2013/0191749 A1* | 7/2013 | Coburn, IV | H04N 21/47 |
| | | | 715/716 |
| 2014/0101170 A1* | 4/2014 | Parekh | G06F 16/148 |
| | | | 707/749 |
| 2014/0281976 A1* | 9/2014 | Chia | H04N 5/783 |
| | | | 715/716 |
| 2016/0026636 A1* | 1/2016 | Spiegelman | G06Q 30/02 |
| | | | 707/732 |

OTHER PUBLICATIONS

PCT International Search Report and Written Opinion issued in International Application No. PCT/IB2015/059622 dated May 30, 2016, 11 pages.

* cited by examiner

METHOD FOR MANAGING MULTIMEDIA FILES

CROSS-REFERENCE TO RELATED APPLICATIONS

This application is a continuation of and claims the benefit of priority to U.S. patent application Ser. No. 15/536,625, filed Jun. 15, 2017, which is a 371 U.S. National Phase Application of and claims the benefit of priority to International Application Serial No. PCT/IB2015/059622, filed Dec. 15, 2015, which claims the benefit of priority to Italian Application Serial No. MI2014A002157, filed Dec. 16, 2014 and Italian Application Serial No. 102015902344341, filed Apr. 15, 2015, the contents of each are hereby incorporated by reference.

BACKGROUND

The concepts herein encompass a method and a processor software for managing multimedia files. Other concepts herein also encompass a method and a software for managing the playback of multimedia files. The concepts herein also concern a system capable of managing the playback of multimedia files.

Software are known for managing multimedia files, for instance software for managing audio and video files. The known software make it possible to manage the playback of the files, for instance through the creation of playlists. Some known software make also it possible to assign labels (or tags) to one or several files with the purpose of classifying the files, grouping the files themselves, or making it possible to search for the audio files via that tag or label assigned thereto. Concerning audio file management, an example of a known software which makes it possible to assign tags to the files is represented by MediaMonkey™ software. Mediamonkey™ is a software which makes it possible to manage music libraries, to search for audio files within such music libraries, and to create playlists. Mediamonkey™ also makes it possible for users, by preset fields, to enter a plurality of information items in each individual audio file, including: author, record company, year, time or rhythm (slow, fast, etc.), album, user comment, song text, bpm, music genre, and others. Operationally wise, upon loading the files in the software, Mediamonkey™ usually recognizes and fills-in some of said fields automatically. As already said before, among the many features offered, Mediamonkey™ makes it possible to associate one or several terms or tags with one and the same file; the purpose of such terms is to characterize the files that they are associated with and on the basis of such terms it is also possible to search for the files in the music libraries. However, a drawback consists in that, usually, a search made on the basis of such terms identifies not only the audio files associated with these terms, but also those audio files which contain such terms in the remaining preset fields. Mediamonkey™ also makes it possible to set some fields customized by a user and it is then possible to also make searches in all fields available or, in order to prevent undesired results, in the customized fields only.

Furthermore, such software, likewise other known software, does not provide users with the possibility of further customizing their audio file management and playing experience. Software are known which allow for a user to select a start audio track or a type of audio track, play the track itself and subsequently, before the selected track ends being played, automatically propose or select one or several audio tracks for being played after the selected one, without any possibility (or with a minimum possibility) for a user to interact. Such audio tracks are automatically proposed or selected by the software on the basis of predetermined grouping or affinity or similarity criteria with the track selected by the user (for instance in terms of music genre, artist, etc.). Software are also known which make it possible for users to realize customized playing lists, the users themselves selecting the specific attributes of the files to be put in such lists. Finally Internet sites are known which offer already classified multimedia contents and make it possible for registered users to provide a feedback to the site administrators about some characteristics of said multimedia files.

However, such software do not allow a playback management that is optimal and in line with the users' needs or sensibility.

SUMMARY

In the light of the above considerations, a main object is to solve one or several of the problems encountered in the known art.

The concepts herein encompass optimizing the management of multimedia file playback.

The concepts herein encompass a rational and logical multimedia file playback management method.

The concepts herein encompass a processor software and a method capable of managing the playback of multimedia files in a simple and customizable way and to consequently improve the playing experience for users.

The concepts herein encompass a system capable of optimizing multimedia file playback management.

The concepts herein encompass a processor software capable of managing the playback of multimedia files in a simple and efficient way.

The concepts herein encompass putting users in a position to customize their own multimedia file playing experience to a greater extent.

The concepts herein encompass enabling users to save the customized playing experience.

The concepts herein encompass enabling users to share their customized playing experiences.

These objects and others, which will be more apparent from the following description, are basically achieved by a multimedia management method and by a processor software in accordance with the information contained in one or several of the attached claims and/or of the following aspects, taken alone or in any combinations with each other or in combination with any of the attached claims and/or in combination with any of the further aspects or features described below.

In one aspect, a method is provided for managing the playback of multimedia files comprising at least the following operating steps:
  generating at least one object for managing the playback of one or several multimedia files, said playback management object comprising at least one multimedia file playback parameter, said operating step whereby at least one playback management object is generated comprising at least an operating step whereby said at least one multimedia file playback parameter is generated;
  generating at least one link between said playback management object and at least a first multimedia file;
  storing said at least one playback management object and/or said link in a memory.
In one aspect, said one or several multimedia file playback management object also comprises one identification element and said operating step whereby at least one playback management object is generated also comprises an operating step whereby said identification element is generated.

In one aspect, the method comprises an operating step whereby at least a first multimedia file or a plurality of multimedia files is played, as a function of said at least one playback parameter of said playback management object, or as a function of a plurality of playback parameters of a corresponding plurality of playback management objects.

In one aspect, the method comprises an operating step whereby one or several multimedia files are played as a function of said at least one playback parameter of said playback management object in accordance with one or several semi-random playback modes comprising both random playback settings and non-random playback settings and/or configurable playback settings and/or playback settings correlated to said playback parameter or to a plurality of said playback parameters.

In one aspect, said playback management object is configured to play, for instance via one or several of said links, a plurality of multimedia files in accordance with one or several semi-random playback modes comprising both random playback settings and non-random playback settings and/or configurable playback settings and/or playback settings correlated to said playback parameter or to a plurality of playback parameters.

In one aspect, said at least one playback management object is configured, by setting an appropriate playback parameter, to manage a configurable multimedia file playback sequence.

In one aspect, said at least one playback management object is configured to set a correlation in a playback order between two or several multimedia files in a semi-random multimedia file playback sequence.

In one aspect, said at least one playback management object is configured to inhibit the playback of given multimedia files within a multimedia file playback sequence or within a semi-random multimedia file playback sequence.

In one aspect, said playback management object is a grouping object configured to manage the playback of a plurality of multimedia files.

In one aspect, the method comprises an operating step whereby at least one playback counter of one or several multimedia files linked to said playback management object is defined, said playback counter being configured to be automatically updated following an integral or partial playback of the multimedia file within a semi-random playback sequence, to take account of such playback having been performed.

In one aspect, the method comprises an operating step whereby said playback counter of one or several multimedia files linked to said playback management object is queried in order to check whether a multimedia file has already been played a predetermined number of times.

In one aspect, the method comprises an operating step whereby the playback of one or several multimedia files within a semi-random playback mode in a way correlated to the result of said query relevant to the value assumed by said playback counter, is played or temporarily inhibited.

In one aspect, the method comprises an operating step whereby said playback counter is automatically updated in the case that a multimedia file has been played for at least a given limit playback time, for instance for at least a time equal to half of its playback duration.

In one aspect, the method comprises an operating step whereby said playback counter is left unchanged in the case that a multimedia file has been played for a time shorter than a given playback limit time, for instance for a time shorter than half of its playback duration.

In one aspect, the operating step whereby at least one playback management object of one or several multimedia files is generated comprises an operating step whereby a grouping object configured to manage the playback of a plurality of multimedia files is generated, preferably by link objects each of which is linked to a respective multimedia file.

In one aspect, the operating step whereby at least one playback management object of one or several multimedia files is generated comprises an operating step whereby one or several grouping objects and at least one thematic grouping are generated, said grouping objects being linked to a plurality of multimedia files, said at least one thematic grouping being configured to manage a playback sequence of the grouping objects and of the multimedia files linked thereto.

In one aspect, the operating step whereby at least one playback management object of one or several multimedia files is generated comprises an operating step whereby a category object configured to manage a plurality of thematic groupings is also generated, said category object being configured to manage a playback sequence of thematic groupings and of the multimedia files linked thereto.

In one aspect, each link comprises a link object to manage the playback of one or several multimedia files, each playback management link object comprising at least one auxiliary identification element and at least one auxiliary multimedia file playback parameter, said operating step whereby at least one link between said playback management object and at least a first multimedia file is generated also comprising an operating step whereby said link object is generated, an operating step whereby at least said auxiliary identification element is generated, and an operating step whereby at least said auxiliary multimedia file playback parameter is generated.

In one aspect, a method is provided for managing the playback of multimedia files comprising at least the following operating steps:
  generating at least one object for managing the playback of one or several multimedia files, said playback management object comprising at least one multimedia file playback parameter, said operating step whereby at least one playback management object is generated comprising at least an operating step whereby said at least one multimedia file playback parameter is generated;
  generating at least one link between said playback management object and at least a first multimedia file;
  storing said at least one playback management object and/or said link in a memory;
  generating a visualization and/or management interface, for instance a graphical visualization and/or management interface, of a plurality of playback management objects, the visualization being preferably correlated to at least one playback structure or mode of said plurality of playback management objects.

In one aspect, the operating step whereby a visualization and/or management interface is generated comprises an operating step whereby a tree or a diagram or a schematization correlated to a playback structure or mode of said plurality of playback management objects is generated.

In one aspect, the operating step whereby at least one playback management object of one or several multimedia files is generated comprises an operating step whereby one or several grouping objects and at least one thematic grouping are generated, said grouping objects being linked to a plurality of multimedia files, said at least one thematic grouping being configured to manage a playback sequence of the grouping objects and of the multimedia files linked thereto, the operating step whereby a visualization and/or management interface is generated comprising an operating step whereby a tree or a diagram or an indicative schematization of the links between grouping objects and/or thematic groupings and/or multimedia files is generated.

In one aspect, the method comprises the following operating steps:
  updating at least one playback counter of one or several multimedia files linked to said playback management object, said playback counter being configured to be automatically updated following an integral or partial playback of multimedia files within a semi-random playback sequence, to take account of such playback having been made, the value assumed by the playback counter being stored in the remote memory;
  transferring from a remote memory to a local memory of a device, in particular a mobile device, and/or from a local memory of a device, in particular a mobile device, to a remote memory, the multimedia files featuring a given value of the playback counter, the transfer of the multimedia files from the local memory of the device to the remote memory freeing filing space in the device.

In one aspect, the method comprises the following operating steps:
  playing in a first device, for instance a processor, one or several multimedia files in a given sequential playback mode, for instance a semi-random playback sequence, as a function of said playback management object and of said at least one said object playback parameter up to a playback stop time;
  synchronizing the first device and a second mobile device, for instance a laptop or a tablet or a smartphone, to a remote memory on the basis of the value assumed by said playback counter for one or several multimedia files;
  resuming the playing, on the second device and at a time following a playback stop time, of the given stopped playback sequential mode.

In one aspect, in order to increase or decrease a multimedia file or a playback management object playback frequency, it is envisaged to increase or decrease the number of times a multimedia file is played within one or several semi-random playback sequences. In one aspect, the category object is a playback management object.

In one aspect, the operating step whereby at least one playback management object of one or several multimedia files is generated comprises an operating step whereby at least one category object is generated.

In one aspect, the category object comprises an identification element and/or at least one playback parameter.

In one aspect, a method is provided for managing multimedia files comprising an operating step whereby at least one playback management object of one or several multimedia files is generated.

In one aspect, generating a playback management object for one or several multimedia files comprises generating, for instance by appropriate controls imparted to a dedicated processor software, a dialogue interface comprising fields for setting and/or modifying multimedia file playback parameters.

In one aspect, the operating step whereby at least one playback management object for one or several multimedia files is generated comprises an operating step whereby at least one link object is generated.

In one aspect, the link object is a playback management object for one or several multimedia files.

In one aspect, the operating step whereby at least one playback management object for one or several multimedia files is generated comprises an operating step whereby at least one grouping object is generated.

In one aspect, the grouping object is a playback management object for one or several multimedia files.

In one aspect, the operating step whereby at least one playback management object for one or several multimedia files is generated comprises an operating step whereby at least one thematic grouping is generated.

In one aspect, the thematic grouping is a playback management object for one or several multimedia files.

In one aspect, the playback management object comprises one identification element and at least one multimedia file playback parameter.

In one aspect, the identification element is assigned by default.

In one aspect, the operating step whereby at least one playback management object for one or several multimedia files is generated comprises an operating step whereby the identification element is generated and an operating step whereby at least one multimedia file playback parameter is generated.

In one aspect, each link object is linked to a multimedia file and to a grouping object, is configured to manage the playback of the multimedia file that it is linked to, and comprises an identification element and a plurality of multimedia file playback parameters, the identification element and the playback parameters being attributes of the link object.

In one aspect, each grouping object is linked to a plurality of multimedia files, is configured to manage the playback of the multimedia files that it is linked to, and comprises an identification element and a plurality of multimedia file playback parameters, the identification element and the playback parameters being attributes of the grouping object.

In one aspect, the link between grouping objects and the plurality of multimedia files is implemented by, or comprises, a corresponding plurality of link objects.

In one aspect, the method comprises an operating step whereby at least one link between the playback management object and at least a first multimedia file is generated.

In one aspect, the operating step whereby at least one link is generated between a playback management object and at least a first multimedia file is substantially concomitant with the operating step whereby at least one playback management object for one or several multimedia files is generated.

In one aspect, the operating step whereby at least one link is generated between the playback management object and at least a first multimedia file follows the operating step whereby at least one playback management object for one or several multimedia files is generated.

In one aspect, the playback management object is a grouping object configured to manage the playback of a plurality of multimedia files and the link consists of, or comprises, a link object.

In one aspect, the grouping object is linked to a plurality of multimedia files via a corresponding plurality of link objects.

In one aspect, each link object links one individual multimedia file to a grouping object.

In one aspect, the method comprises an operating step whereby at least the playback management object and/or the link is/are stored in a memory.

In one aspect, the operating step whereby at least one link between said playback management object and at least a first multimedia file is generated takes place following the operating step whereby said at least one playback management object is stored.

In one aspect, the playback management object comprises a plurality of multimedia file playback parameters.

In one aspect, the operating step whereby at least one playback management object is generated comprises an operating step whereby a plurality of multimedia file playback parameters is generated.

In one aspect, the method comprises operating steps whereby a previously generated playback management object is edited, the previously generated multimedia file playback parameters are edited, for instance by assigning a value thereto or by modifying their values, and the edited playback management object and the edited multimedia file playback parameters are stored in a memory.

In one aspect, the operating step whereby at least one playback management object for one or several multimedia files is generated comprises an operating step whereby a plurality of playback management objects is generated.

In one aspect, the operating step whereby at least one playback management object for one or several multimedia files is generated comprises an operating step whereby a plurality of link objects is generated.

In one aspect, the operating step whereby at least one playback management object for one or several multimedia files is generated comprises an operating step whereby a plurality of grouping objects is generated.

In one aspect, the operating step whereby at least one playback management object for one or several multimedia files is generated comprises an operating step whereby a plurality of thematic groupings is generated.

In one aspect, the operating step whereby at least one link between the playback management object and at least a first multimedia file is generated comprises an operating step whereby a plurality of links between the grouping object and a corresponding plurality of multimedia files is generated.

In one aspect, the operating step whereby at least the playback management object and/or the link is/are stored in a memory comprises an operating step whereby a plurality of playback management objects and/or a plurality of links is/are stored in a memory.

In one aspect, the method comprises an operating step whereby one or several multimedia files is/are played as a function of one or several playback management objects and of at least one playback parameter of said object.

In one aspect, the operating step whereby at least one link between the playback management object and at least a first multimedia file is generated comprises an operating step whereby a plurality of link objects is generated.

In one aspect, the operating step whereby a grouping object is generated is performed before the operating step whereby a plurality of link objects is generated.

In one aspect, the grouping object comprises a plurality of multimedia files playback parameters, the operating step whereby the grouping object for the link objects is generated also comprises an operating step whereby the plurality of multimedia file playback parameters is generated.

In one aspect, the method comprises an operating step whereby a grouping object and/or a plurality of link objects linked to the grouping object is/are stored in a memory.

In one aspect, the method comprises an operating step whereby a plurality of grouping links between the grouping object and the link objects is generated.

In one aspect, the method comprises an operating step whereby a playlist or list of playback of a plurality of link objects is generated and/or played.

In one aspect, the method comprises an operating step whereby a playlist or list of playback of a plurality of grouping objects is generated and/or played.

In one aspect, the operating step whereby at least one link between the playback management object and at least a first multimedia file is generated comprises an operating step whereby a plurality of grouping links between the grouping object and the link objects is generated.

In one aspect, the grouping links comprise one or several link objects.

In one aspect, the operating step whereby at least one link between a playback management object and at least a first multimedia file is generated is managed by the playback management object.

In one aspect, the playback management object comprises a link between the playback management object and at least a first multimedia file.

In one aspect, the operating step whereby at least one playback management object for one or several multimedia files is generated comprises an operating step whereby a grouping object is generated and an operating step whereby at least one link between the playback management object and at least a first multimedia file is generated comprises an operating step whereby a plurality of link objects between the grouping object and a corresponding plurality of multimedia files is generated.

In one aspect, the operating step whereby at least one playback management object for one or several multimedia files is generated comprises an operating step whereby at least one grouping object configured to manage a plurality of multimedia files is generated, the method comprising an operating step whereby a plurality of links between the grouping object and a corresponding plurality of multimedia files associated with the grouping object is generated.

In one aspect, the method comprises an operating step whereby a respective unique identifier is allocated to one or several multimedia files in particular to all multimedia files processed, for each multimedia file the unique identifier remaining unchanged with respect to a change of allocation of the multimedia file or to a replacement of the multimedia file for instance by a different version of the same multimedia file.

In one aspect, the playback management object is a grouping object configured to manage the playback of a plurality of multimedia files.

In one aspect, the operating step whereby an identification element is generated and/or the operating step whereby at least one multimedia file playback parameter is generated is/are performed automatically through the generation of a default standard value.

In one aspect, the identification element is allocated automatically or semi-automatically.

In one aspect, the identification element is correlated to the name of a multimedia file linked to the link and/or to the link object.

In one aspect, the identification element coincides with the name of a multimedia file linked to the link and/or to the link object.

In one aspect, the method comprises an operating step whereby one or several thematic groupings of the playback management objects is/are generated or defined.

In one aspect, the multimedia files comprise at least one or several of the following types of file: audio files, video files, image files, photographs, text files or files comprising a text or tables, files comprising dynamic objects like objects that are moving upon playing the file, hypertext links linking to multimedia files, addresses of web pages in the internet or in another computer network, containing multimedia files, programs capable of playing multimedia files, etc.

In one aspect, the multimedia file playback parameters are one or several selected from the following list: playback speed, playback frequency, playback volume, fade-in of a multimedia file at the start of the multimedia file playback, fade-out of the multimedia file at the end of the multimedia file playback, inhibition of a multimedia file playback, iteration of a multimedia file playback, playback sequence with respect to one or several further multimedia files, controlled playback of a multimedia file following, or preceding, another given multimedia file, controlled playback for a time fraction not exceeding the duration of a multimedia file playback, start of a multimedia file playback at a given portion or instant of the multimedia file, end of a multimedia file playback at a given portion or instant of the multimedia file, etc.

In one aspect, the playback management object is configured to set and/or manage a playback sequence of a plurality of multimedia files.

In one aspect, the playback sequence can be either random or pre-set.

In one aspect, the thematic grouping is configured to manage a playback sequence of the grouping objects.

In one aspect, by "playing a grouping object" we mean playing one or several audio files linked to the grouping object.

In one aspect, by "playing a thematic grouping" we mean playing one or several audio files linked to the thematic grouping, the link between thematic groupings and audio files comprising one or several grouping objects and/or one or several link objects.

In one aspect, by "playing a link object" we mean playing the audio file linked to the link object.

In one aspect, the method comprises an operating step whereby a plurality of multimedia files is indexed as a function of the identification element used to identify the playback management object linked to the multimedia files.

In one aspect, the method comprises an operating step whereby a plurality of multimedia files is indexed as a function of the identification element of its corresponding plurality of link objects.

In one aspect, by "indexing a plurality of multimedia files" we mean storing the identification elements used to identify the grouping objects and/or the link objects in a memory and making such multimedia files available via a search based on the identification elements.

In one aspect, the set of the multimedia file playback management objects and their respective multimedia file parameters, and in particular the set of the link objects, of the grouping objects, of their respective multimedia file playback parameters and/or of the thematic groupings, determines, or is comprised in, a user profile, the method comprising an operating step whereby a user profile is shared by other users, for instance by appropriate controls imparted to a dedicated processor software.

In one aspect, the method comprises an operating step whereby one or several user profiles is/are stored in a local or remote memory, each user profile comprising one or several multimedia file playback management objects and their respective multimedia file playback parameters.

In one aspect, the method is a method implemented in a computer.

In one aspect, a processor software is provided configured to implement one or several of the operating steps of the method according to one or several of the previous aspects and/or of the attached claims.

In one aspect, a processor software is provided configured to perform one or several of the operating steps of the method according to one or several of the aspects and/or any of the attached claims.

In one aspect, said software is stored in a memory and/or is installed in a mobile device and/or is installed in a server.

In one aspect, said software is accessible via a computer network, via the world wide web, or via an internet page.

In one aspect, a processor software is provided installed in a server accessible via a computer network, for instance via the world wide web or via an internet page.

In one aspect, a processor software is provided, configured to perform at least the following operating steps of the method:
  generating at least one object for managing the playback of one or several multimedia files, said playback management object comprising at least one multimedia file playback parameter, said operating step whereby at least one playback management object is generated comprising at least an operating step whereby said at least one multimedia file playback parameter is generated;
  generating at least one link between said playback management object and at least a first multimedia file;
  storing said one playback management object and/or said link in a memory.

In one aspect, the software is configured to perform at least the following operating steps of the method:
  playing at least a first multimedia file, or a plurality of multimedia files as a function of said at least one playback parameter of said playback management object, or as a function of a plurality of playback parameters of a corresponding plurality of playback management objects;
  playing one or several multimedia files as a function of said at least one playback parameter of said playback management object in accordance with one or several semi-random playback modes comprising both random playback settings and non-random playback settings and/or configurable playback settings and/or playback settings correlated to said playback parameter or to a plurality of said playback parameters.

In one aspect, the software is configured to generate a visualization and/or management interface, for instance a graphical visualization and/or management interface, of a plurality of playback management objects, the visualization being preferably correlated to at least one playback structure or mode of said plurality of playback management objects.

In one aspect, a processor software is provided, configured to perform at least the following operating steps of the method:
  generating at least one playback management object of one or several multimedia files, the playback management object comprising at least one identification element and at least one multimedia file playback parameter, the operating step whereby at least one playback management object is generated comprising at least an operating step whereby the identification element is generated and an operating step whereby at least one multimedia file playback parameter is generated;

generating at least one link between the playback management object and at least a first multimedia file;

storing at least the playback management object and/or the link in a memory.

In one aspect, a software is provided comprising a user interface and a processor.

In one aspect, the processor is configured to perform one or several of the operating steps of the method in accordance with one or several of the aspects and/or any of the attached claims.

In one aspect, the processor is configured:

to generate at least one playback management object of one or several multimedia files, the playback management object comprising at least one identification element and at least one multimedia file playback parameter, the operating step whereby at least one playback management object is generated comprising at least an operating step whereby the identification element is generated and an operating step whereby at least one multimedia file playback parameter is generated;

to generate at least a link between the playback management object and at least a first multimedia file;

to store at least the playback management object and/or the link in a memory.

In one aspect, generating the playback management object of one or several multimedia files comprises generating, by appropriate controls imparted to the processor software via the user interface, a dialogue interface comprising fields for setting and/or modifying multimedia file playback parameters.

In one aspect, the processor is configured to generate the identification element and at least one multimedia file playback parameter.

In one aspect, the processor is configured to operate on multimedia files upon receipt of voice controls.

In one aspect, the user interface is configured to receive voice controls and to control the execution of operating steps by the processor on the basis of the voice controls received.

In one aspect, the user interface is configured to receive voice controls and to manage the playback of multimedia files as a function of the voice controls received.

In one aspect, the user interface is configured to set the identification element and/or one or several playback parameters of the playback management object.

In one aspect, the user interface comprises a user profile, the user profile being configured to store at least one playback management object and/or at least one link between the playback management object and at least a first multimedia file and/or at least one grouping object and/or at least one link object and/or a plurality of grouping links between the grouping object and the link objects.

In one aspect, the processor software is configured to have a user profile shared by other user, for example upon receipt an input from the user interface.

In one aspect, the processor software is configured to store one or several user profiles in a memory, for instance upon receipts an input from the user interface, each user profile comprising one or several multimedia file playback management objects and their respective multimedia file playback parameters.

In one aspect, the processor software is configured to edit a previously generated playback management object, to edit previously generated multimedia file playback parameters, for instance by assigning a value thereto or modifying their values, and to store the edited playback management object and the edited multimedia file playback parameters in a memory.

In one aspect, the processor software is configured to link one and the same multimedia file to a plurality of grouping objects, for instance via a plurality of corresponding link objects.

In one aspect, the processor software is configured to play one and the same multimedia file in a plurality of playback modes, each playback mode being managed as a function of a playback management object and of its playback parameters.

In one aspect, the processor software is configured to set and/or to manage a playback sequence of a plurality of playback management objects, for instance of a plurality of grouping objects.

In one aspect, the grouping object playback sequence can be random o pre-set.

In one aspect, the processor software is configured to set the grouping object playback sequence.

In one aspect, the processor software is configured:

to set, add and/or modify one or several multimedia file playback parameters, for instance via the user interface, and/or to set, for instance via the user interface, that a given multimedia file shall be played immediately before or immediately after a given other multimedia file, and/or to inhibit the playback of a given multimedia file, for instance via the user interface.

In one aspect, the processor software is configured to index a plurality of multimedia files as a function of the identification element used to identify the playback management object linked to the multimedia files.

In one aspect, the processor software is configured to index a plurality of multimedia files as a function of the identification element of its corresponding plurality of link objects.

In one aspect, the processor software is configured to allow the sharing of a user profile by other users, for instance by appropriate controls imparted to the user interface of the processor software.

In one aspect, the processor software is installed and/or operates in a server.

In one aspect, the processor software operates via a computer network.

In one aspect, the processor software is a software used to manage multimedia files, including audio files, video files, text files or files comprising a text, files comprising dynamic objects including objects that are moving upon playing the file.

In one aspect, the processor software is implemented on a web platform and is accessible to a plurality of users via a computer network, in particular via the internet.

In one aspect, the processor software is accessible via an internet site and is accessible to a plurality of users via a computer network, in particular via the internet.

In one aspect, the user interface is accessible via an internet site.

In one aspect, the processor software operates on multimedia files stored in a remote memory.

In one aspect, the processor software operates on multimedia files stored in one and the same server in which it is installed and/or operates.

In one aspect, the processor software is a software application configured to be installed and implemented in a mobile device.

In one aspect, the memory is connected to, or is comprised in, the processor software.

In one aspect, the user interface or the user profile comprises a memory.

In one aspect, a memory is provided wherein a processor software is stored, configured to implement at least the following operating steps:

generating at least one playback management object of one or several multimedia files, the playback management object comprising at least one identification element and at least one multimedia file playback parameter, the operating step whereby at least one playback management object is generated comprising at least an operating step whereby the identification element is generated and an operating step whereby at least one multimedia file playback parameter is generated;

generating at least one link between the playback management object and at least a first multimedia file;

storing at least the playback management object and/or the link in a memory.

In one aspect, the memory is the memory of a processor.

In one aspect, it is the user who configures and manages the playback of the multimedia files via the multimedia file playback management objects, controls the storage of the multimedia file playback management objects in a memory, and shares the user profile with other users.

In one aspect, the user interacts with the processor software via dialogue interfaces of the user profile put at disposal via the user interface.

In one aspect, a system is provided comprising:

at least one device, in particular a mobile device like a laptop or a tablet or a smartphone, comprising a local memory, a remote memory connectable to said at least one device, said memory being configured to store multimedia file playback related information, a processor software installed in said at least one device and/or in a remote processor, the software being configured to perform one or several of the operating steps of the method according to one or several of the previous aspects and/or any of the attached claims, the software also being configured:

to update at least one playback counter of one or several multimedia files linked to said playback management object, said playback counter being configured to be automatically updated following an integral or partial playback of multimedia files within a semi-random playback sequence, to take account of said playback having been performed, the value assumed by the playback counter being stored in the remote memory;

transferring from the remote memory to the local memory of the device and/or from the local memory of the device to the remote memory those multimedia files which feature a given value of the playback counter, the transfer of the multimedia files from the local memory of the device to the remote memory freeing filing space in the device.

In one aspect, the system comprises a first device, for instance a processor, and one second mobile device, the software being installed in said devices and the remote memory being shared by said devices, the software being configured:

to play on the first device one or several multimedia files in a given sequential playback mode, for instance in a semi-random playback sequence, as a function of said playback management object and of said at least one playback parameter of said object until a playback stop time;

to synchronize the first and second devices to the remote memory on the basis of the value assumed by said playback counter for one or several multimedia files;

to resume, in the second device and in an instant in time subsequent to a playback stopping instant in time, the playback of the given sequential playback mode stopped.

In one aspect, the synchronization of a devices to said remote memory is performed on the basis of a query of said playback counter of one or several multimedia files linked to said playback management object.

In one aspect, the software is configured to transfer in said remote memory the multimedia files played by the device and/or to download or upload onto the device multimedia files to be played, the transferring of multimedia file from the device to the remote memory freeing filing space in the device.

In one aspect, the software is configured to delete from said remote memory or from said device the multimedia files featuring a different given value of the playback counter or a given plurality of different values of the playback counter.

BRIEF DESCRIPTION OF THE DRAWINGS

A detailed description of one or several preferred embodiments is given now for explanatory and not limitative purposes, wherein.

DETAILED DESCRIPTION

Figure 1:
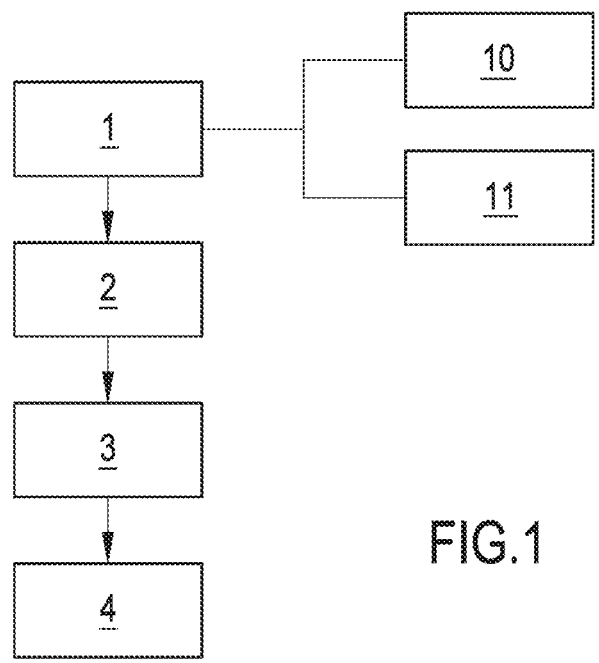
FIG. 1 represents a method in accordance with a preferred embodiment.

FIG. 1 illustrates a method for managing multimedia files F1, F2, FN. In particular, the method operates onto a plurality of multimedia files F1, F2, FN, for instance belonging to one of the following types of files: audio files, video files, image files, photographs, text files or files comprising a text or tables, files comprising dynamic objects including objects that are moving upon playing the files, etc.

The method comprises an operating step 1 whereby at least one object W, L is generated to manage the playback of one or several multimedia files, an operating step 2 whereby a link between the playback management object W, L, and at least one multimedia file is generated, and an operating step 3 whereby the playback management object W, L and the link are stored in a memory M. The method 1 might also comprise an operating step 4 whereby one or several multimedia files is/are played as a function of the playback management object W, L and in particular in accordance with the object W, L playback parameters P.

Figure 2:
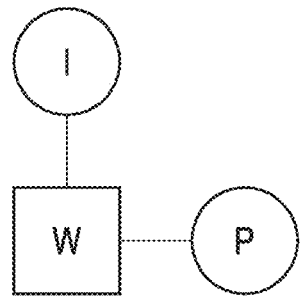
FIG. 2 represents a grouping object onto which the method and the software according an embodiment can operate.
Figure 3:
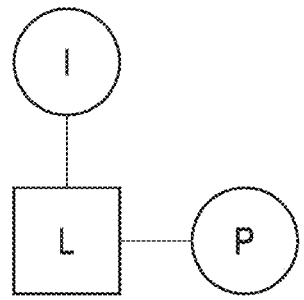
FIG. 3 represents a link object onto which the method and the software according to an embodiment can operate.

The playback management objects W, L comprise an identification element I and a set of multimedia file playback parameters P (see FIGS. 2 and 3); the set of playback parameters P can comprise one or several playback parameters. The identification element I and the playback parameter P can be generated within their respective operating steps 10, 11 comprised in the operating step 1 whereby the playback management object W, L is generated. In other words, as illustrated in FIG. 1, the operating step 1 whereby the playback management object W, L is generated can comprise an operating step 10 whereby the object W, L identification element I is generated and an operating step 11 whereby the object W, L playback parameters P are generated. The function of the identification element I is to identify the playback management object W, L that it refers to and can assume for instance the form of a name or a numeric or alphanumeric code and/or comprise symbols.

Figure 4:
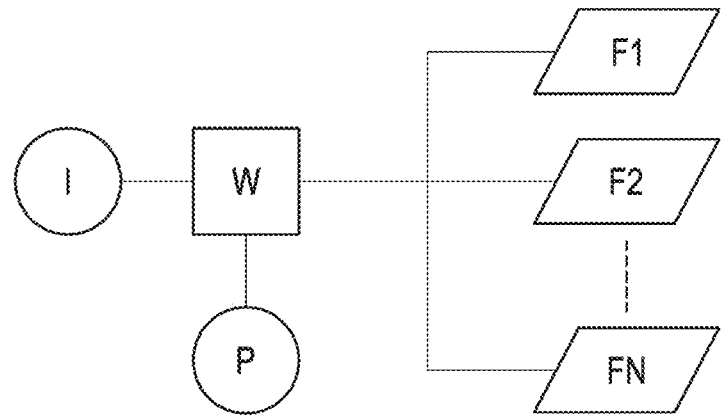
FIG. 4 represents a grouping object onto which the method and the software according to an embodiment can operate.

The playback management objects W, L can be grouping objects W or link objects L. The grouping objects W operate onto a plurality of multimedia files F1, F2, FN and manage their playback via the playback parameters P. For instance, FIG. 4 illustrates a grouping object W linked to a plurality of multimedia files F1, F2, FN. In practice, operationally wise, selecting or setting one or several playback parameters P for a grouping object W and linking a plurality of multimedia files F1, F2, FN thereto, after or before the operating step whereby one or several playback parameters P is/are selected or set, corresponds to setting the conditions for the implementation of the operating step 4, i.e. for playing the multimedia files F1, F2, FN in accordance with the playback parameters P of the grouping object W. Operationally wise, upon playing the multimedia files F1, F2, FN, such playback parameters P of the grouping object W apply to each multimedia file F1, F2, FN linked to the grouping object W.

Figure 5:
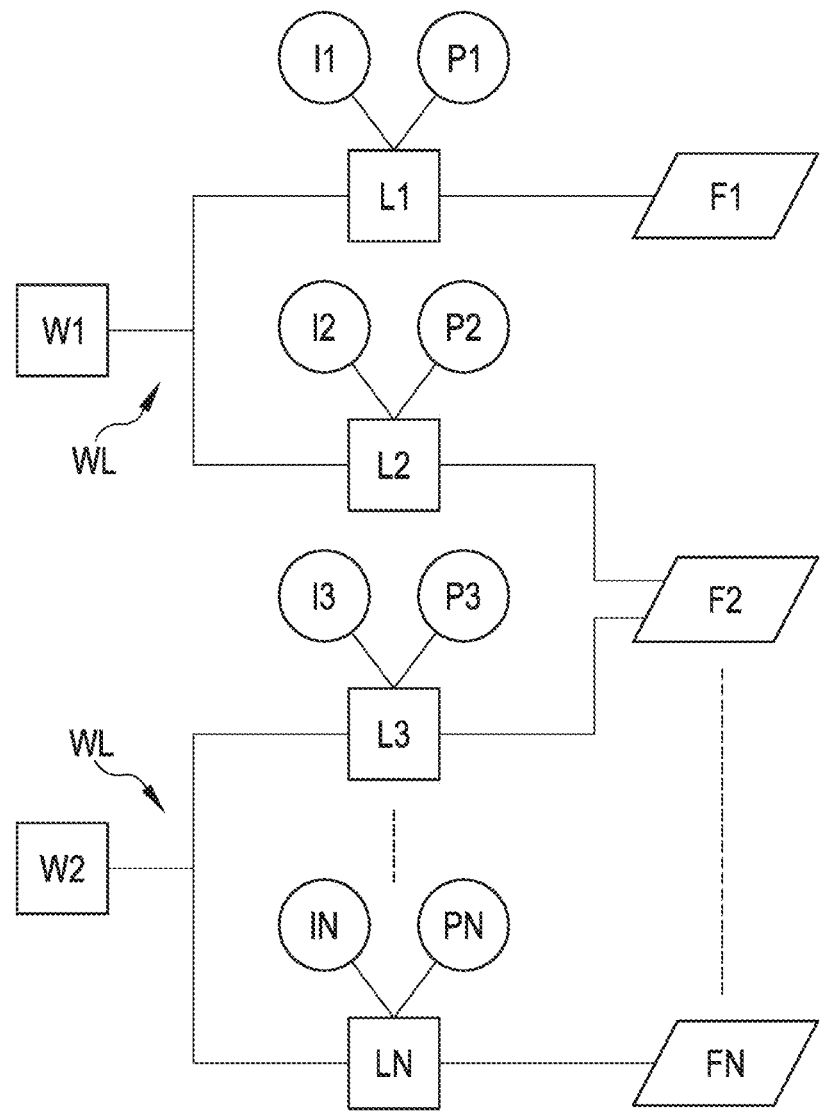
FIG. 5 represents two grouping objects and their respective link objects onto which the method and the software according to an embodiment can operate.
Figure 6:
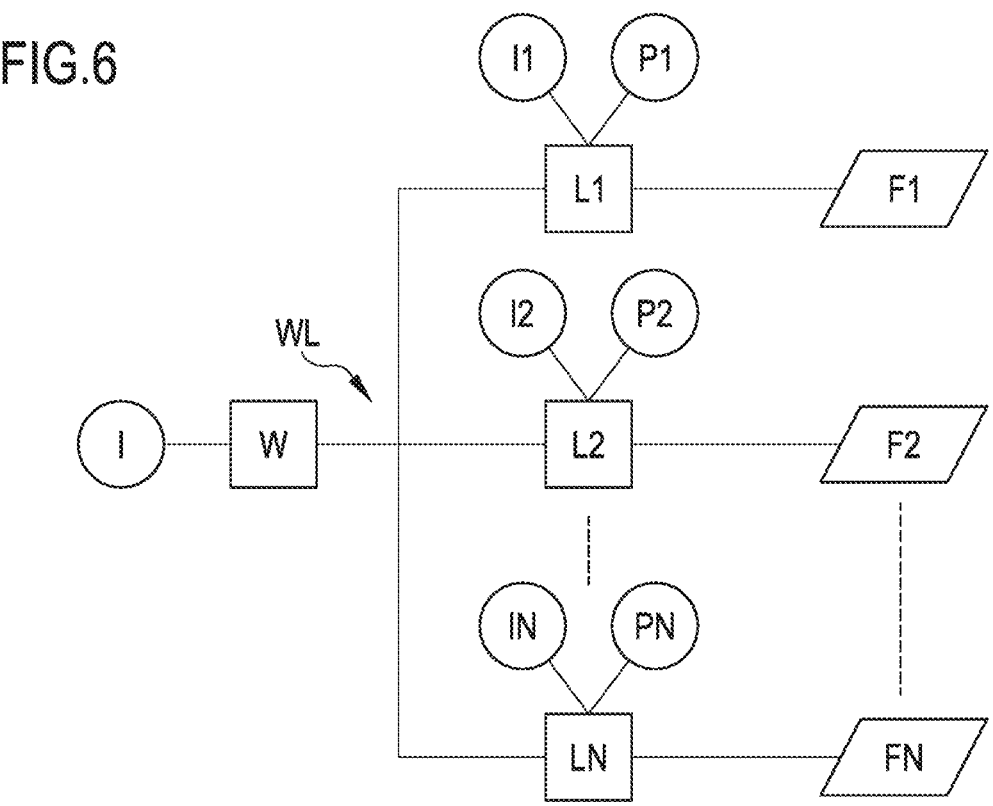
FIG. 6 represents a grouping object and its respective link objects onto which the method and the software according to an embodiment can operate.
Figure 7:
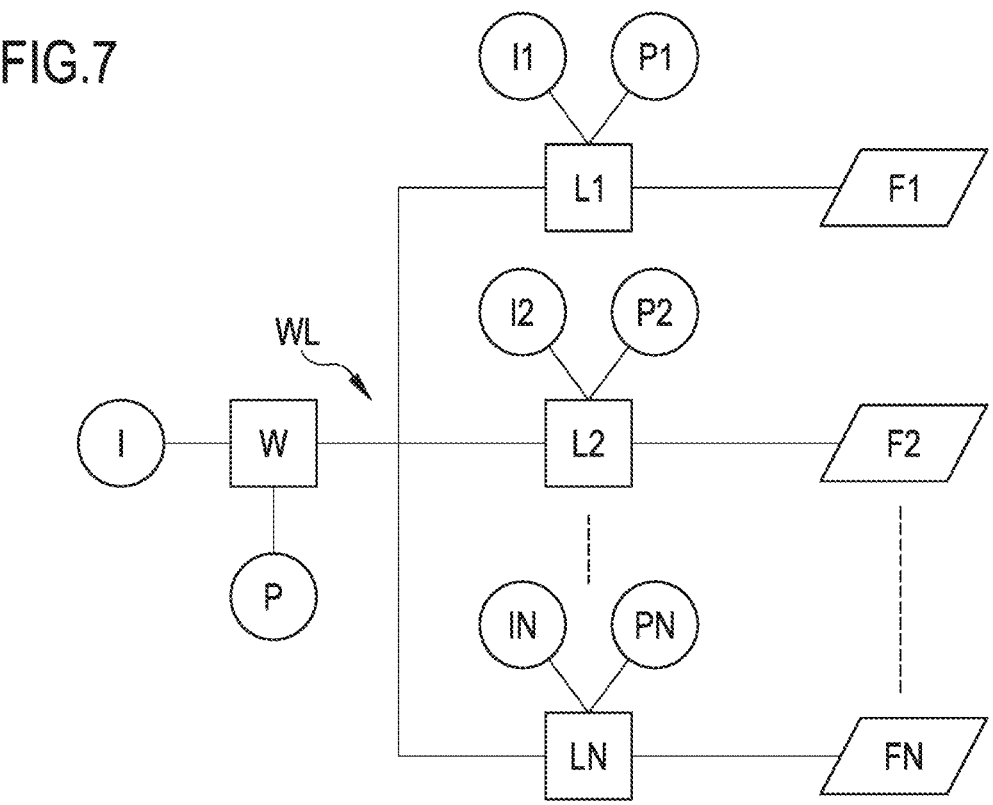
FIG. 7 represents a grouping object and its respective link objects onto which the method and the software according to an embodiment can operate.

Unlike the grouping objects W which operate onto a plurality of multimedia files F1, F2, FN, the link objects L are configured to operate onto one individual multimedia file and to manage the playing via the playback parameters P. In particular, the link objects L act as a link between one or several grouping objects W and one individual multimedia file. As illustrated in FIGS. 5, 6, and 7 the link objects L can be linked to one and the same grouping object W, for instance via grouping links WL. FIGS. 6 and 7 illustrate a plurality of multimedia files F1, F2, FN linked to a grouping object W via respective link objects L1, L2, LN. The link objects L1, L2, LN comprise an identification element I1, I2, IN and a set of playback parameters P1, P2, PN respectively, each of which can comprise only one playback parameter P or a plurality of playback parameters P. Therefore, the multimedia files F1, F2, FN can be played in accordance with the set of parameters P1, P2, PN respectively linked thereto via their respective link object L1, L2, LN. Also, one and the same multimedia file can be linked to a plurality of grouping objects W via a corresponding plurality of link objects L. For instance, FIG. 5 illustrates a first grouping object W1 linked to the multimedia files F1, F2 via their respective link objects L1, L2 and a second grouping object W2 linked to the multimedia files F2, FN via their respective link objects L3, LN. Each link object L1, L2, L3, LN comprises a respective identification element I1, I2, I3, IN and a respective set of playback parameters P1, P2, P3, PN; optionally, the grouping elements W1, W2 can also comprise a respective identification element I and respective playback parameters P. In practice, FIG. 5 illustrates a multimedia file F2 linked both to the first and to the second grouping object W1, W2 respectively via the link objects L2, L3. In this way, one and the same multimedia file F2 can be selectively played in accordance with two different sets of parameters P2, P3; specifically, the multimedia file F2 is played in accordance with the set of playback parameters P2 of the link element L2 within the playback of the first grouping object W1 and is played in accordance with the set of playback parameters P3 of the link element L3 within the playback of the second grouping object W2. In general, concerning instead a plurality of multimedia files F1, F2, FN linked to one grouping object W, each link object L1, L2, LN operates by linking its respective multimedia file F1, F2, FN to the one grouping object W, which comprises an identification element I and at least one playback parameter P. In a variant, the grouping object W comprises an identification element I, but it does not comprise any playback parameter P. In accordance with what said above, FIG. 6 illustrates a grouping object W which comprises an identification element I, but does not comprise any playback parameter P, whereas FIG. 7 illustrates a grouping object W comprising an identification element I and playback parameters P. In this event, i.e. whenever the grouping object W that the multimedia files F1, F2, FN are linked to comprises in turn playback parameters P, it is possible, if there is a conflict between playback parameters P of the grouping object W and of the link object L, to manage to make the playback parameters P of the link object L prevail over the playback parameters P of the grouping object W or vice versa. By conflict between playback parameters P of the grouping object W and playback parameters P of the link object L we mean for instance a situation whereby both objects W, L have at least one and the same playback parameter P featuring two values that are different from each other. For instance, with reference to the "speed" playback parameter, a playback speed set for the link object L (hence for the multimedia file linked thereto) to a value equal to 30% the highest speed possible might create a conflict with a playback speed set for the grouping object W to a value equal to 50% of the highest speed possible, whereas, if both speeds feature one and the same value or if either object W, L does not feature a value set for the "speed" playback parameter, there is no conflict with respect to such playback parameter.

In other words, the method makes it possible to support at least two "playback management levels" for each multimedia file; a first playback management level is represented by the grouping object W and a second playback management level is represented by the link object L. Both playback management levels are configurable through a selection of the playback parameters P. FIG. 7, for instance, illustrates a schematic representation wherein both playback management levels are present, in that both the grouping object W and each link object L1, L2, LN present their respective playback parameters P. Conversely, FIG. 6 illustrates a schematic representation wherein the playback level consisting of the link object L1, L2, LN only is present and FIG.

Figure 8:
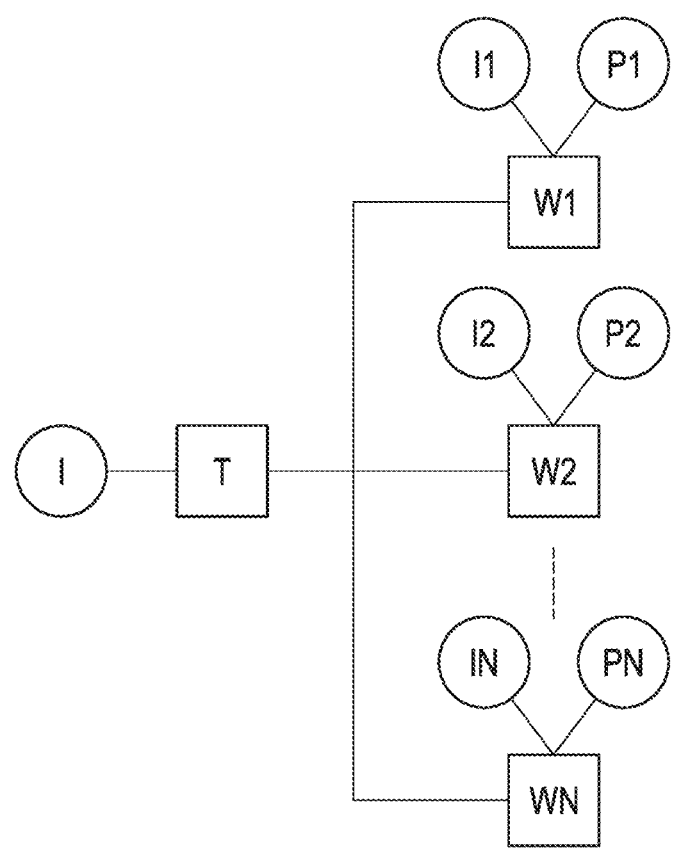
FIG. 8 represents a thematic grouping of grouping objects onto which the method and the software according to an embodiment can operate.

4 illustrates a schematic representation wherein the playback level consisting of the grouping object W only is present. In the operating step 1 of the method, a plurality of grouping objects W1, W2, WN can be generated, each of which is linked to a corresponding plurality of multimedia files to manage their playback through a respective link generated in the operating step 2 of the method. It is also possible to support at least one thematic grouping T of grouping objects W; the thematic grouping T can comprise in turn an identification element I. The thematic grouping T can feature a "tree" logical structure, wherein one or several branches of the tree comprise a respective grouping object W. FIG. 8, for instance, illustrates a thematic grouping T comprising an identification element I and linked to a plurality of grouping objects W1, W2, WN. Each grouping object W can in turn be directly linked to a corresponding plurality of multimedia files F1, F2, FN (similar to what illustrated in FIG. 4) or by link objects L1, L2, LN (similar to what illustrated in FIG. 6 and in FIG. 7); by direct link between grouping objects W and multimedia files, we mean a link that does not comprise link objects L.

A thematic grouping T can be used, for instance, to group a plurality of grouping objects W1, W2, WN together and to classify them on the basis of the identification element I of the thematic grouping T. For instance, a thematic grouping T can be used to classify grouping objects W having common characteristics, like similar playback parameters P and/or multimedia files of one and the same type. In particular, a thematic grouping T can be exclusively used to classify the grouping objects W, hence the multimedia files associated therewith, or can comprise in turn one or several playback parameters P and be also configured to manage the playback of the multimedia files, thus providing a third playback management level which adds to the playback management level consisting of the grouping object W and to the playback management level consisting of the link objects L. For instance, a thematic grouping T can be configured to manage a playback sequence between grouping objects W (or chain of grouping objects W). The management of the playback sequence of the grouping objects W can be configured on the basis of the tree structure of the thematic grouping T and can be modified, for instance by displacing grouping objects W1, W2, WN between branches of the tree. Furthermore, placing a grouping object W1, W2, WN in a given branch can also affect the playback parameters P of the grouping object W1, W2, WN.

The operating step 4 of the method can be performed in such a way as to play one or several multimedia files F1, F2, FN as a function of at least one playback parameter P of a playback management object W, L and in accordance with a plurality of semi-random playback modes. The playback of the multimedia files F1, F2, FN is managed by the playback management objects W, L and is preferably performed within a semi-random playback sequence. By semi-random playback mode we mean, in the context of the present description, playback modes comprising random playback settings and non-random or configurable playback setting; the configurable playback settings can be correlated to one or several playback parameters P or set by said playback parameters P. A random playback setting, for instance, can be made by default, in particular by a software S configured to implement the method (the software S will be described below), and one or several configurable playback settings can be configured, by a software S, by a user by setting one or several playback parameters P.

The method can provide the definition or creation, by a software S configured to implement the method, of a playback counter of one or several multimedia files F1, F2, FN linked to a playback management object W, L. The playback counter is configured to be automatically updated, for instance by a software S configured to implement the method, following an integral or partial playback of a multimedia file (for instance within a semi-random playback sequence). If a multimedia file F1, F2, FN is played for at least a given limit playback time period, for instance for at least a time period equal to half of its playback duration, then the playback counter is automatically updated (a value of the playback counter bound to the multimedia file is updated); otherwise, if the multimedia file is played for a period shorter than a given limit playback time period, for instance for a time period shorter than half of its playback duration, then the playback counter is left unchanged (a value of the playback counter bound to the multimedia file is not modified). At this point, according to the method, the playback counter is queried (by checking the value assumed by the playback counter for one or several multimedia files F1, F2, FN) to check whether one or several multimedia files F1, F2, FN has/have already been played a predetermined number of times and, as a function of the result of the query, the method specifies that one or several multimedia files be played, or their playing be temporarily inhibited. For instance, should the value of the playback counter equal "1" for a determined multimedia file (because, for instance, such multimedia file has already been played once and for at least the given limit playback time duration) and "0" for the remaining multimedia files destined to be played within one and the same semi-random playback sequence, then the method specifies that the playback of the said multimedia file (whose playback counter value equals "1") be temporarily inhibited until the remaining multimedia files are played. After being played once for at least the given limit playback time period, the remaining multimedia files will also feature a value of the playback counter equal to "1". Such query of the playback counter is in accordance with, and can be made within, a random playback setting, which, for instance, can be implemented by default by the software S.

The playback management object W, L can also be configured, by setting one or several playback parameters P, to manage a configurable playback sequence of multimedia files F1, F2, FN, to set a time correlation in an order of playback between two or several multimedia files (in particular within a semi-random multimedia file playback sequence), to inhibit the playback of multimedia files within a playback sequence of multimedia files (in particular within a semi-random sequence of multimedia files and/or to increase or decrease the playback frequency of a playback management object W, L or of a multimedia file within one or several semi-random playback sequence. By increasing or decreasing the playback frequency of the multimedia file we mean increasing or decreasing the number of times a multimedia file is played within one or several semi-random playback sequence. The operating step whereby the playback frequency of a multimedia file or of a playback management object W, L is increased or decreased is performed by setting or signing a playback parameter P or a repetition indicator to the multimedia file or to the playback management object; the playback parameter P or the repetition indicator is configured to make it possible a multiple playback of a multimedia file within a semi-random playback sequence or to temporarily inhibit the playback of a multimedia file within said semi-random playback sequence.

The method might also comprise an operating step whereby the playback of one or several multimedia files F1, F2, FN or of one or several playback management objects W, L is inhibited, in particular within a semi-random playback sequence; such inhibition can be performed by setting a playback parameter P. Inhibition can be effective until such playback parameter P is modified to remove the inhibit setting.

The method might also comprise an operating step whereby, by an appropriate playback parameter P of multimedia files F1, F2, FN of a playback management object W, L, the playback of a given multimedia file and/or of a given playback management object W, L linked to a multimedia file, for instance a link object L, is set to be immediately performed after playing another given multimedia file or another given playback management object W, L. For instance, a grouping object W can be configured to make it possible a sequential playback of link objects L1, L2, LN (hence of their respective multimedia files F1, F2, FN linked thereto); in particular, it can be specified for a grouping object W that a given link object L (hence the multimedia file linked thereto) be played immediately after playing a further link object (hence after playing the multimedia file linked to said further link object).

Such playing can be performed by setting an appropriate playback parameter P to that link object of the two link objects as specified above, which is played first in time, so that, when its playback is over, the playback parameter P makes it possible the playback of said further link object.

In turn, a thematic grouping T can operate as a playback management object (third playback management level) to manage a playback sequence between grouping objects W linked thereto in a mode similar to the playback management mode that a grouping object W operates onto the link objects L1, L2, LN linked thereto. In the case of a playback management by a thematic grouping T, the setting of the playback parameters P (by which playback is managed) can be performed for the individual grouping objects W.

A category object C can also be provided, linked to a plurality of thematic groupings T. In particular, the category object C can be a playback management object and can be generated during the operating step 1 of the method. The category object C can comprise an identification element I and one or several playback parameters P. The category object C can be configured to manage the playback of thematic groupings T linked thereto, for instance by setting playback parameters P of the same category object C or of the thematic groupings T; in other words, the category object C can operate as a fourth playback management level, which adds to the playback management levels represented by the link objects L, by the grouping objects W, and by the thematic groupings T.

Figure 18:
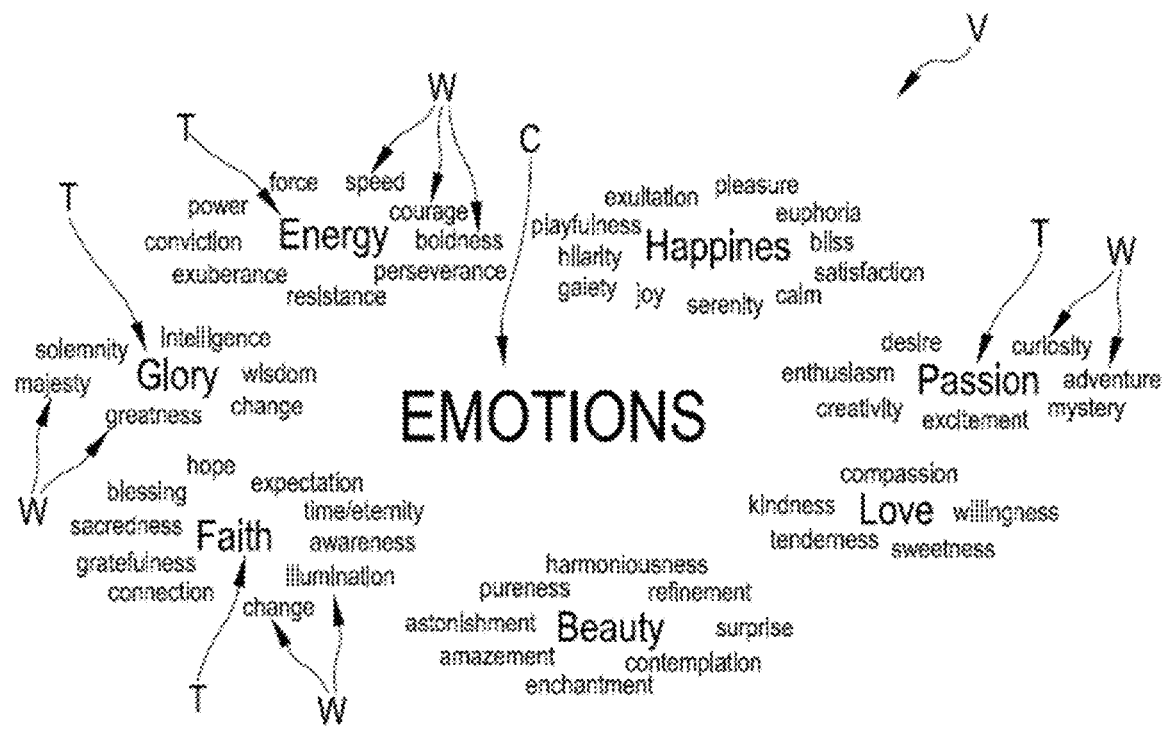
FIG. 18 represents a playback management object visualization and/or management interface which can be generated according to an operating step of the method according to an embodiment.

The method can also provide the generation of a visualization interface V, for instance a graphical visualization interface, to visualize a plurality of playback management objects W, L. The visualization interface V can also be destined to, and allow, the management of the playback management objects W, L. The visualization of said playback management objects W, L is correlated to at least one playback structure or mode of the playback management objects W, L. For instance, FIG. 18 illustrates a visualization interface V, where there is a category object C (identified by the "Emotions" identification element) in the middle of the visualization interface V and a plurality of thematic groupings T (identified by their respective identification elements, including: "Energy", "Glory", "Faith", etc.) arranged around the category object C. Around each thematic grouping T, a plurality of grouping objects W is arranged (for instance, for the "Energy" thematic grouping, the grouping objects are identified by their respective identification elements, including: "speed", "courage", "boldness", etc.). The grouping objects W are linked in turn to link objects L (not shown in FIG. 18); in practice, the link objects L link the grouping objects W to the multimedia files F1, F2, FN.

In accordance with such arrangement of grouping objects W, thematic groupings T and category object C, the visualization interface V is advantageously correlated to, and provide information on, the hierarchical structure of the playback management objects (just consisting of category objects C, thematic groupings T, grouping objects W—and link objects L not shown in FIG. 18-). Other visualization modes can be provided for these playback management objects indeed, for instance a tree structure or a diagram or a schematization or an alternative structure.

If one goes on and plays a thematic grouping T, the software S provides a playback of the link objects (hence of their respective multimedia files linked thereto) linked to all grouping objects linked in turn to the thematic grouping T, whereas, if one goes on and plays one individual grouping object, the software S only manages to play the link objects linked to said grouping object. Preferably, is the playback of the link objects and of the multimedia files linked thereto performed within a semi-random multimedia file playback sequence. The concepts herein are also related to a processor software S configured to manage the playback of a plurality of multimedia files F1, F2, FN. Preferably is the software S configured to implement the previously described method. In particular, the software S is configured to determine or create a playback counter, to query the playback counter (in accordance with the previously described operating steps of the method) and to play or temporarily inhibit the playback of one or several multimedia files F1, F2, FN within a semi-random playback mode correlated to the result of the query of the playback counter. The software S is also configured to update, or to leave unchanged, the playback counter as a function of the playback of the multimedia files, as described above. The software S is also configured to set and/or manage semi-random playback modes or sequences of the previously described type.

Figure 9:
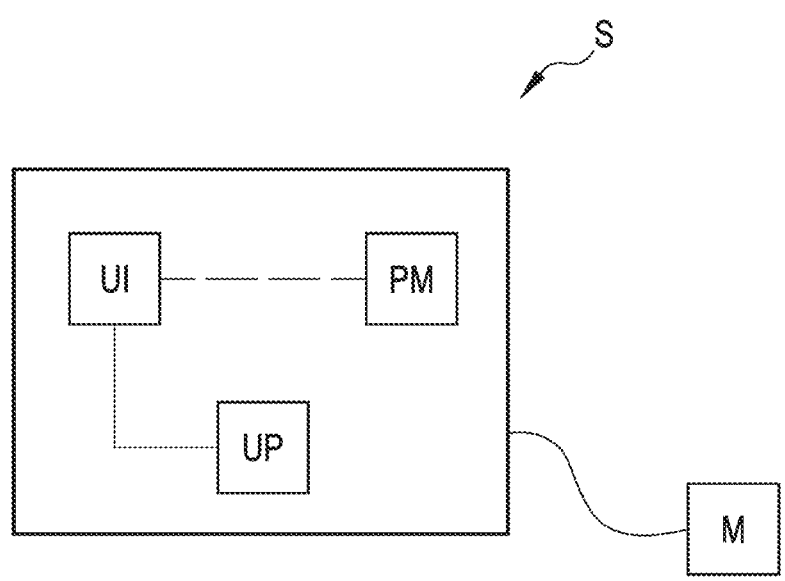
FIG. 9 represents a processor software according to an embodiment.

The software S can be stored or installed in a memory M, LM, RM. The software S can be installed in a device 201, 202, in particular in a mobile device (for instance a laptop or a tablet or a smartphone) and/or in a server. In particular, the software S is accessible via a computer network, via the world wide web or via an internet page. Preferably is the software accessible from and/or operates on a web platform. As shown in FIG. 9, the software S comprises a user interface UI and processor PM operationally linked to the user interface UI. Preferably the processor PM is configured to operate on the multimedia files F1, F2, FN upon receipt of an input from the user interface UI. The processor PM is configured to generate at least one playback management object W, L of one or several multimedia files. In particular, upon receipt of an input from the user interface UI, the processor PM is configured to generate at least one grouping object W and/or a link object L and to generate at least one link between the playback management object W, L and at least one multimedia file F1. The user interface UI also allows to operate on the playback management object W, L in order to generate, select, and/or set the playback parameters P and, optionally, the identification element I. The processor PM is also configured to generate at least one link between the playback management object W, L and at least one multimedia file.

The software S can be stored or installed in or linked to a memory M, LM, RM to make it possible to store the playback management object W, L and the links between the objects W, L and the multimedia files. For instance, the user interface UI can comprise a user profile UP configured to store, via a memory M, LM, RM, at least one playback management object W, L. In other words, the user profile UP can be configured to store at least one grouping object W and/or at least one link object L. The memory M, LM, RM can be for instance the memory of a processor. In accordance with an embodiment, the user interface UI is configured to receive voice controls and to control the processor PM and to manage the playback of multimedia files as a function of the voice controls received. The user can interact with the software S via dialogue interfaces (or masks or dialogue windows) 100 of the user interface UI (see FIGS. 10-12 and 14-15).

The software S is configured to play the multimedia files F1, F2, FN in accordance with one or several semi-random playback modes. In particular, the software S is configured to allow to set the playback parameters P that allow to manage the playback. Such playback parameters P can allow a user of the software S to create and manage a configurable playback sequence of multimedia files F1, F2, FN, to set a time correlation in an order of playback between two or several multimedia files (for instance within a semi-random multimedia file playback sequence). The playback parameters P make also it possible for a user of the software S to inhibit the playback of multimedia files F1, F2, FN within a multimedia file playback sequence F1, F2, FN (in particular within a semi-random multimedia file playback sequence) and/or to increase or decrease the playback frequency of a playback management object W, L or of a multimedia file within one or several semi-random playback sequences. In other words, the software S is configured to perform one or several of the operating steps of the previously described method. This allows for a user to create and customize one or several semi-random playback modes, which allow for the user to customize his/her multimedia file playing experience.

Concerning the playback of the multimedia files F1, F2, FN, the software S is also configured to play one and the same multimedia file in accordance with a plurality of playback modes. Such feature is possible because the software S is configured to link one and the same multimedia file to a plurality of grouping objects W via a respective plurality of link objects L and is also configured to play such multimedia file in accordance with the playback parameters P of each individual object W, L that the multimedia file is linked to. In other words, in order to play a multimedia file in accordance with different playback parameters P, it is not necessary to have a plurality of copies of the same multimedia file, but one multimedia file linked to a plurality of grouping objects W via a corresponding plurality of link objects L; in this respect see for instance the multimedia file F2 in FIG. 5, which is linked to two separate grouping objects W1, W2 via the link objects L2, L3 respectively.

Furthermore, the software S is configured to allocate to the multimedia files a unique identifier which remains unchanged with respect to changes of allocation of the multimedia file or replacements of the multimedia file. For instance, a multimedia file can be replaced by a different version of one multimedia file without losing the information related to the grouping objects W and to the link objects L linked thereto just thanks to such unique identifier associated with the multimedia file. The allocation of a unique identifier to each multimedia file can be performed by the software S upon loading the files in the software S or in a memory M.

The software S can also be configured to index a plurality of multimedia files F1, F2, FN as a function of the identification element I of the link objects L, the grouping objects W, and/or the thematic grouping T. In other words, the software S can be configured to store such identification elements I in a memory M and to subsequently make the multimedia files F1, F2, FN linked to the objects W, L or to the thematic grouping T accessible through a search by identification element I. For this purpose, the software S can be provided with a specific searching mask within which it is possible to perform such search for multimedia files based on the identification elements I.

The software S can be installed in one or several devices 201, 202, for instance in a processor 201 and in a mobile device 202, which can include a respective local memory LM and share one and the same remote memory RM. In the remote memory RM information is stored relevant to the playback of the multimedia files F2, F2, FN and in particular information related to the values assumed by the playback counter. The remote memory RM is connectable to the devices 201, 202 and in particular it is shared by them. Multimedia files F1, F2, FN can also be stored in the remote memory RM. The remote memory RM can also be included, for instance, in a system of the "cloud computing" type; in particular, the remote memory RM can be a memory of a remote processor. In the local memory LM of the devices 201, 202 multimedia files F1, F2, FN can be stored for being played by the software S in accordance with the previously described method. Upon playing the multimedia files F1, F2, FN in a device 201, 202, the playback counter is automatically updated as previously described and the values of the playback counter are stored at least in the remote memory RM. During the playback of the multimedia files F1, F2, FN in a device 201, 202, as a function of the values assumed by the playback counter, provisions can be made to transfer multimedia files F1, F2, FN from the local memory LM of the device 201, 202 to the remote memory RM, or vice versa. Preferably is the transfer of the multimedia files F1, F2, FN performed from the local memory LM to the remote memory RM, in such a way as to free filing space in the device 201, 202. The transfer of the multimedia files F1, F2, FN is performed by the software S and concerns multimedia files that feature a given value of the playback counter. For instance, provisions can be made for a transfer from the local memory LM to the remote memory RM of already played multimedia files F1, F2, FN, i.e. multimedia files F1, F2, FN whose value of the playback counter corresponds to a condition of multimedia files having already been played. In other words, the already played multimedia files F1, F2, FN can be transferred from the local memory LM of the device 201, 202 to the remote memory RM. Transferring files from the device 201, 202 to the remote memory RM is particularly advantageously in that it allows to face a local memory LM having a limited filing space or in any case to free filing space in the device 201, 202. The devices 201, 202 can also be synchronized to the remote memory RM; such synchronization is performed on the basis of the value assumed by the playback counter and makes it possible, following a stop in playing multimedia files F1, F2, FN in a device 201 (for instance a processor), to resume the playback in a mobile device 202 (for instance a smartphone) in an instant in time subsequent to the instant in time the playing was stopped. Synchronization makes it possible to resume the playback of the multimedia files F1, F2, FN in the mobile device 202, for instance within a semi-random playback sequence; resuming the playback makes it possible to continues the semi-random playback sequence by resuming the playback, in the mobile device 202, exactly from the instant in time it had been stopped. Such resumption of the playback is possible through the updating of the playback counters in the remote memory RM. Preferably is the synchronization of the devices 201, 202 to the remote memory RM performed on the basis of a query of the playback counter of one or several multimedia files F1, F2, FN.

In general, the software S and the method can support the generation of a plurality of grouping objects W, a plurality of link objects L, and/or a plurality of thematic groupings T and/or one or several category objects C, which can be variously linked and can manage the playback of the multimedia files in accordance with the modes illustrated in the present description.

Figure 16:
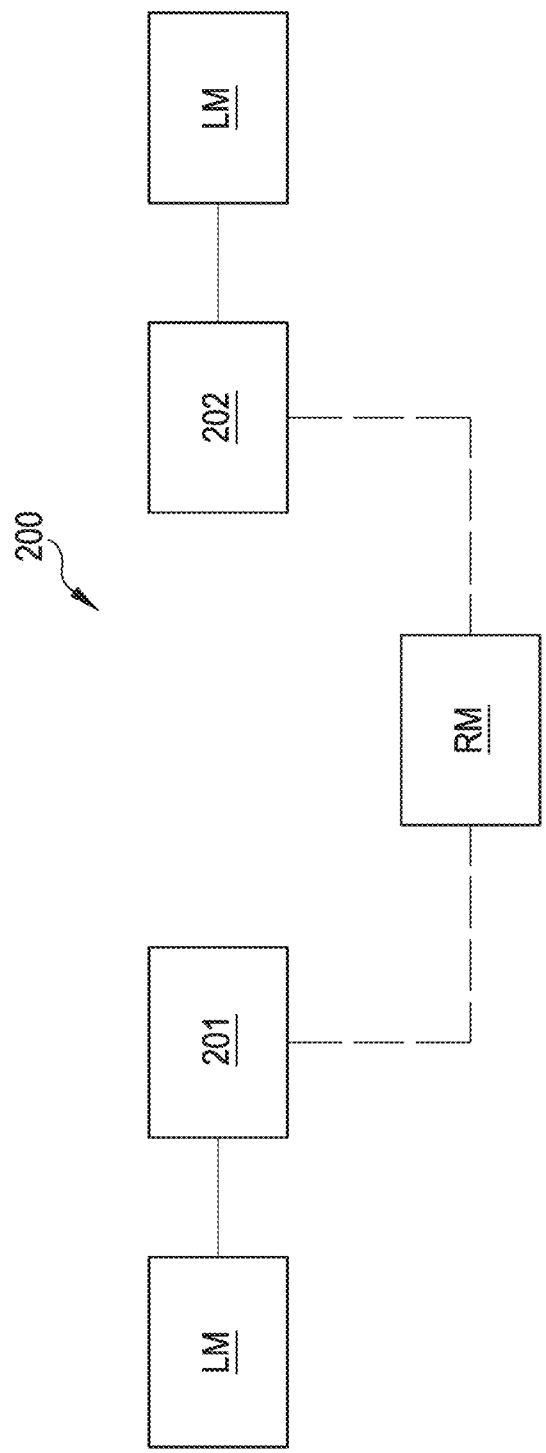
FIG. 16 represents a system according to an embodiment.

The concepts herein also concern a system 200 (see FIG. 16) comprising one or several devices 201, 202, a remote memory RM, and a processor software S of the previously described type. The software S is installed in the devices 201, 202 and is also operational in the remote memory RM to make it possible a synchronization of the devices 201, 202 to the remote memory RM itself as already described before. For the devices 201, 202 and the remote memory RM, different versions of the software S can be provided or different portions of the software S can be installed.

In the continuation of the present description, in order to exemplify embodiments of the method and of the software S, reference will be made to a method and a software for managing audio files (see FIGS. 10-15 and 17-18); however, the method and the software S can also be applied to other types of multimedia files, including those previously described.

Figure 10:
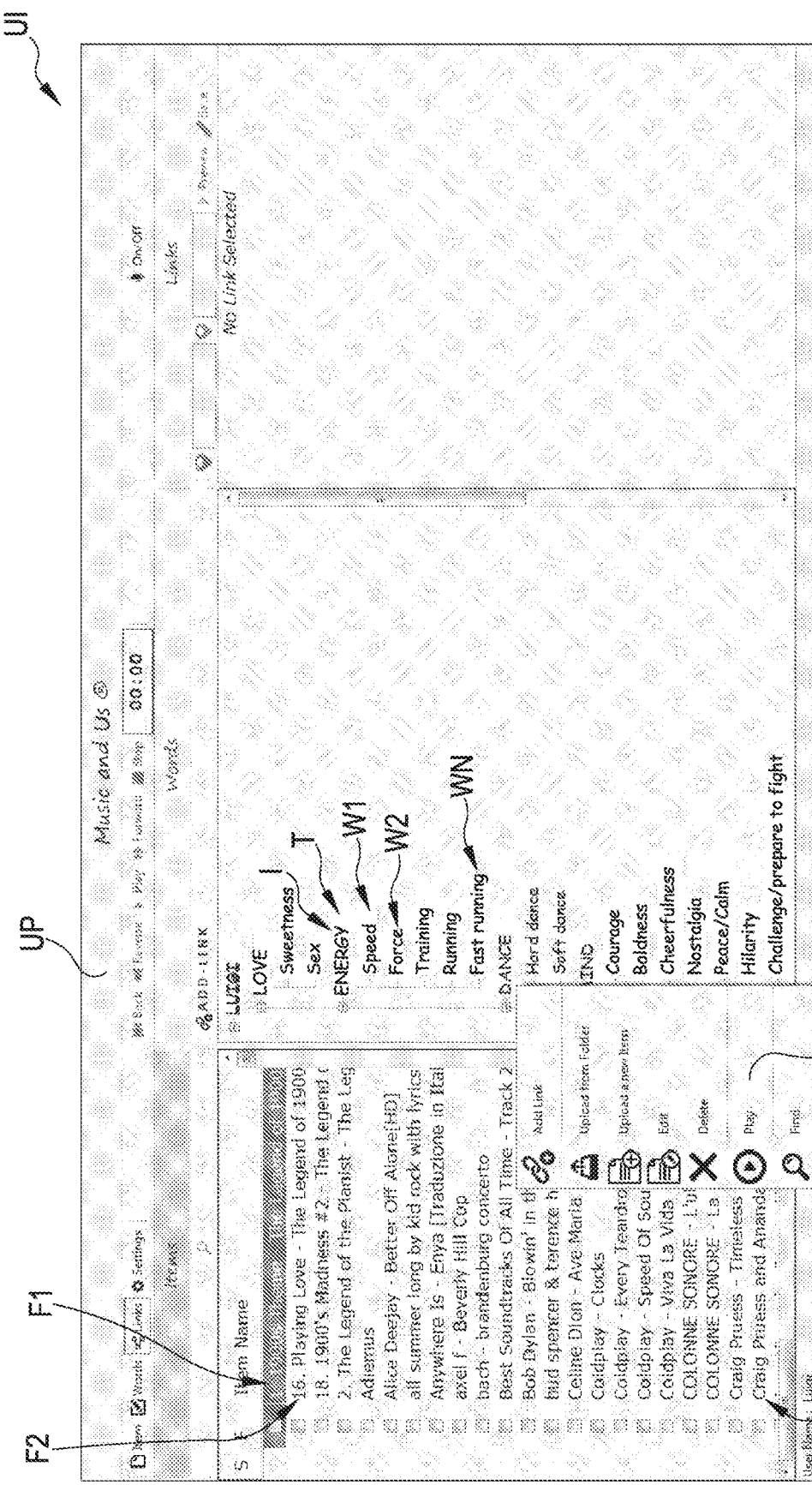
FIGS. 10 thru 15 represent operating configurations of a user interface of a processor software according to an embodiment.

The software S is capable of operating, via an input of the user interface UI, on a library of audio files (also referred to as music library) and makes it possible for a user to organize his/her own music library through customized associations (these are the previously described link objects L, also briefly referred to as "Links") between one or several audio files and one or several "keywords" (these are the previously described grouping objects W, also referred to as "Words"). In the continuation of the present description, by "customized association" we mean the link objects L, and by "keywords" we mean the grouping objects W. For instance, FIGS. 10-15 illustrate possible operational configurations of a user profile UP within a user interface UI of the software S. As illustrated in such figures, the user interface UI is basically subdivided into three areas C; the left-hand area corresponding to the column located below the title "Items") is destined to managing the audio files, the middle area (corresponding to the column located below the title "Words") is destined to managing the thematic groupings T and the keywords grouped into their respective thematic groupings T (see in particular FIG. 10 and FIG. 14), and the right-hand area (corresponding to the column located below the title "Links") is destined to managing the customized associations. FIG. 10 illustrates a plurality of audio files F1, F2, FN, which can be linked to one or several thematic groupings T, to one or several grouping objects W1, W2, WN, and to one or several link objects L1, L2, LN. FIG. 10 also shows a number of management options for the selected audio file F1 put at disposal by the dialogue interface 100; among these, let's emphasize in particular the "Add Link" option, by which it is possible to generate a link object L (and its respective identification element I and playback parameters P) to link the audio file F1 to at least one grouping object W1, W2, WN, and the "Play" option which allows to play the multimedia file F1.

Figure 11:
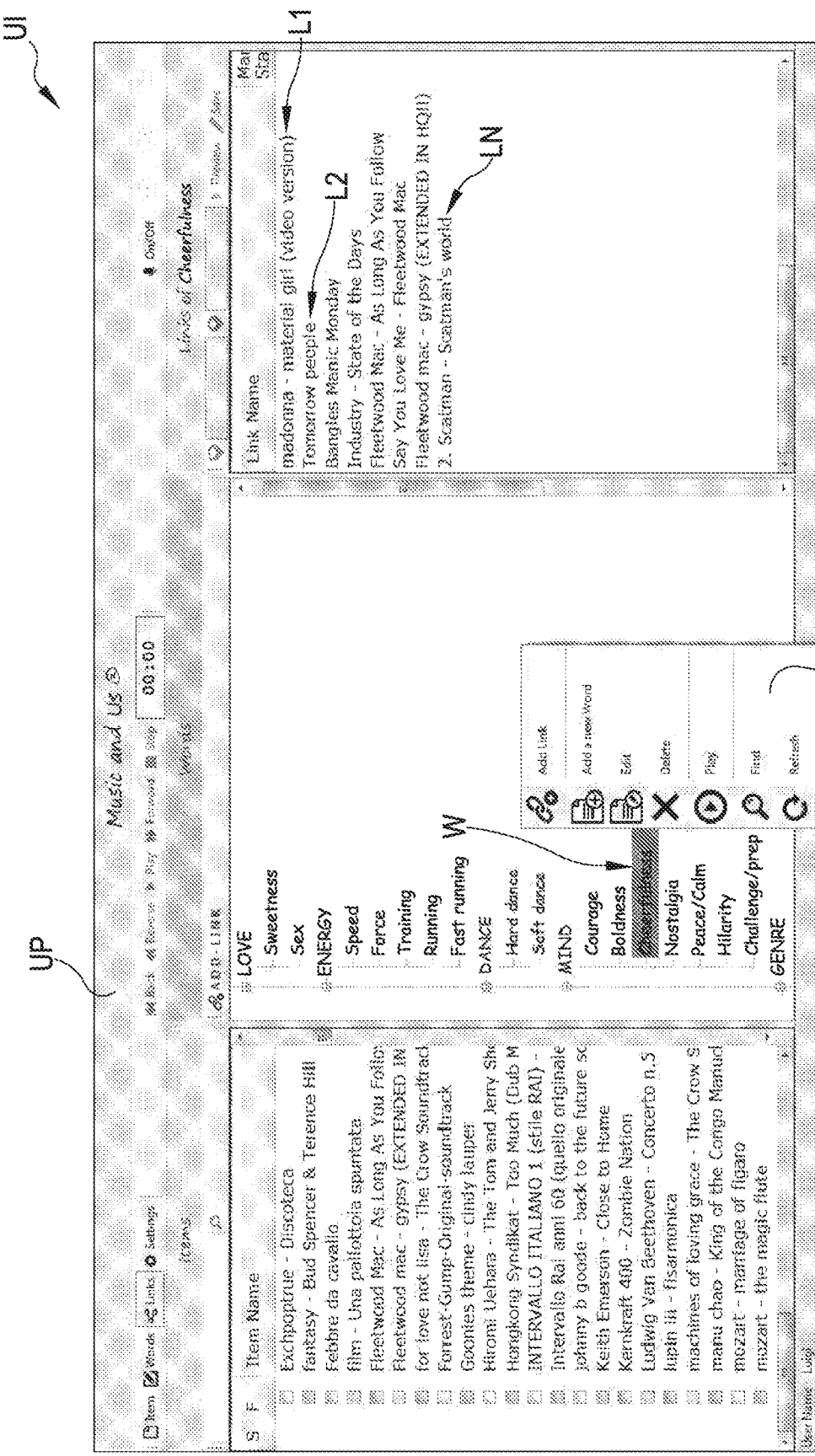

FIG. 11 illustrates a grouping object W and a plurality of link objects L1, L2, LN linked thereto. FIG. 11 also shows a number of grouping object management options put at disposal by the dialogue interface 100; among these, let's emphasize the "Add Link" option, by which it is possible to generate a link object L (and its respective identification element I and playback parameters P) for instance to link an audio file to the selected grouping object, the "Add a new Word" option, by which it is possible to generate a further grouping object W (and its respective identification element I and playback parameters P), the "Edit" option which allows to modify the selected grouping object W (and its respective identification element I and playback parameters P), and the "Play" option which allows to play the selected grouping object W.

Figure 12:
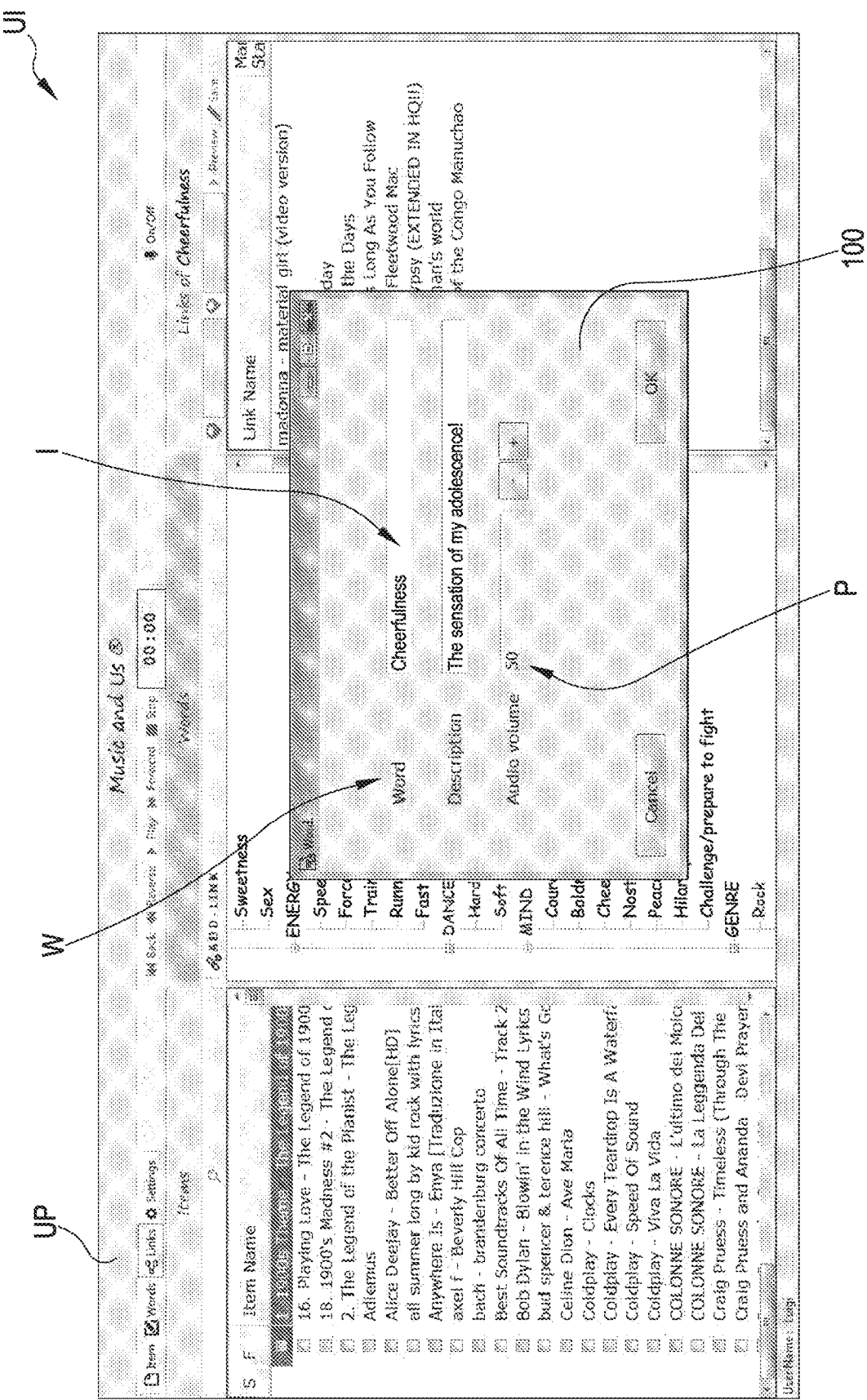
Figure 13:
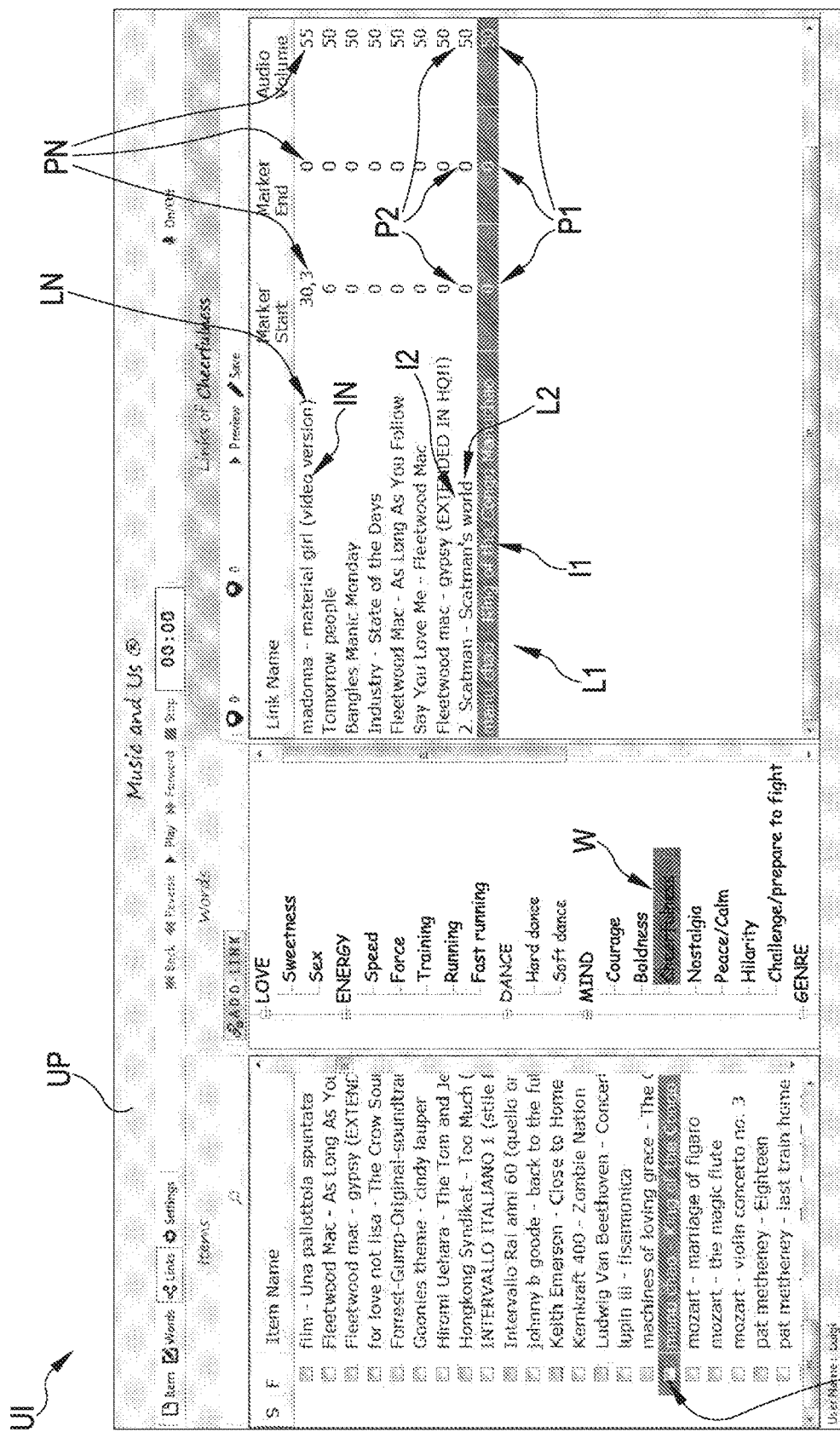

FIG. 12 illustrates the dialogue interface 100 after selecting the above mentioned "Edit" option; the figure shows that such dialogue interface 100 makes it possible to modify the identification element I and the playback parameter P of the grouping object W and to store the modifications made on the grouping object W by clicking the "OK" option. FIG. 13 illustrates a grouping object W linked to a plurality of link objects L1, L2, LN, each of which is provided with its respective identification elements I1, I2, IN and its respective playback parameters P1, P2, PN.

Figure 14:
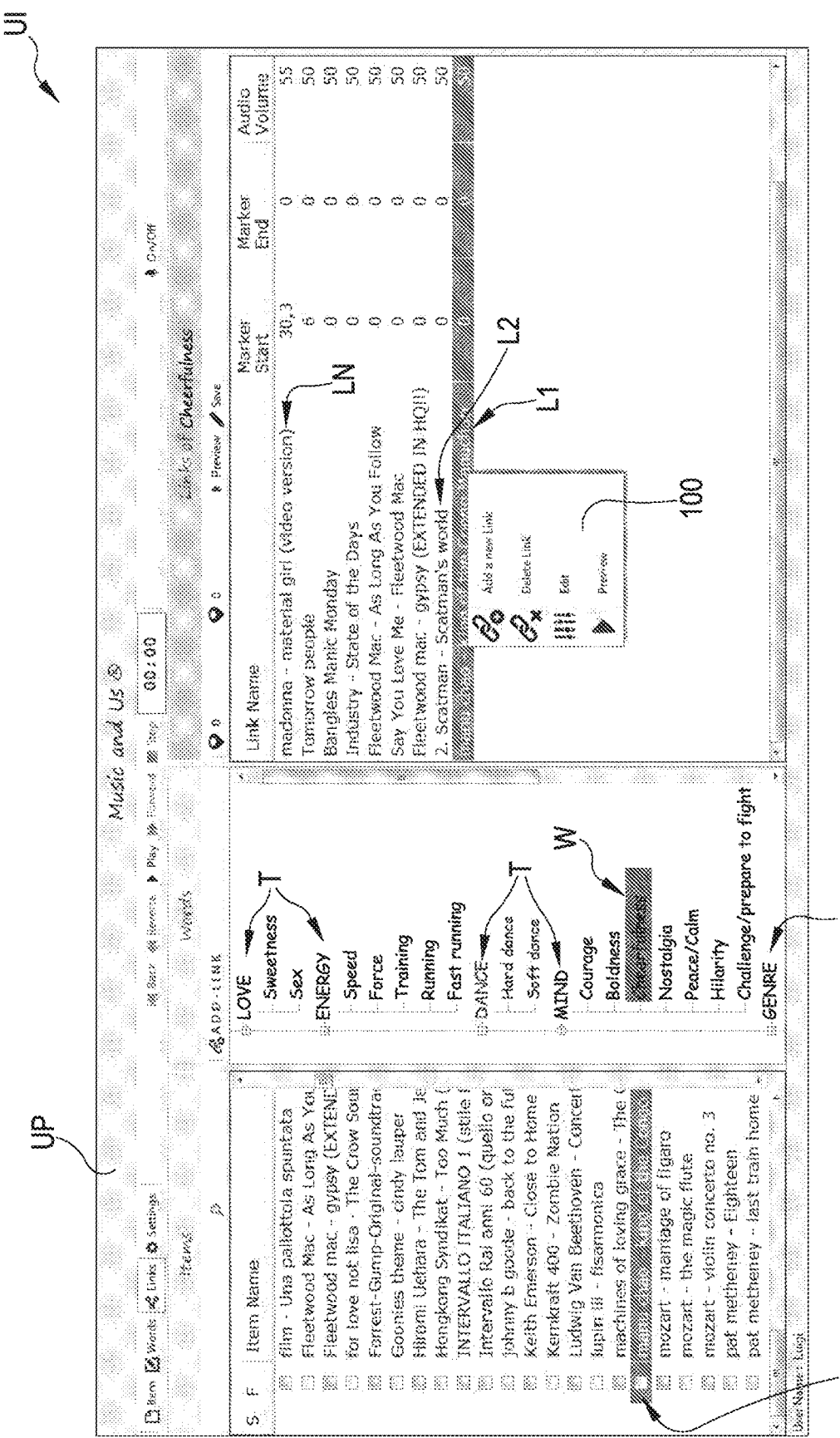

FIG. 13 and FIG. 14 also show an audio file F1 linked to the grouping object W via the link object L1.

FIG. 14 also shows a grouping object W linked to a plurality of link objects L1, L2, LN, and a plurality of thematic groupings T. FIG. 14 also shows a number of link object management options put at disposal by the dialogue interface 100; among these, let's emphasize the "Add a new Link" option, by which it is possible to generate a further link object L, for instance to link the audio file F1 to a further grouping object (further with respect to the grouping object W that the audio file F1 is already linked to via the link object L1), and the "Edit" option which allows to modify the selected link object L1 (and its respective identification element and playback parameters).

Figure 15:
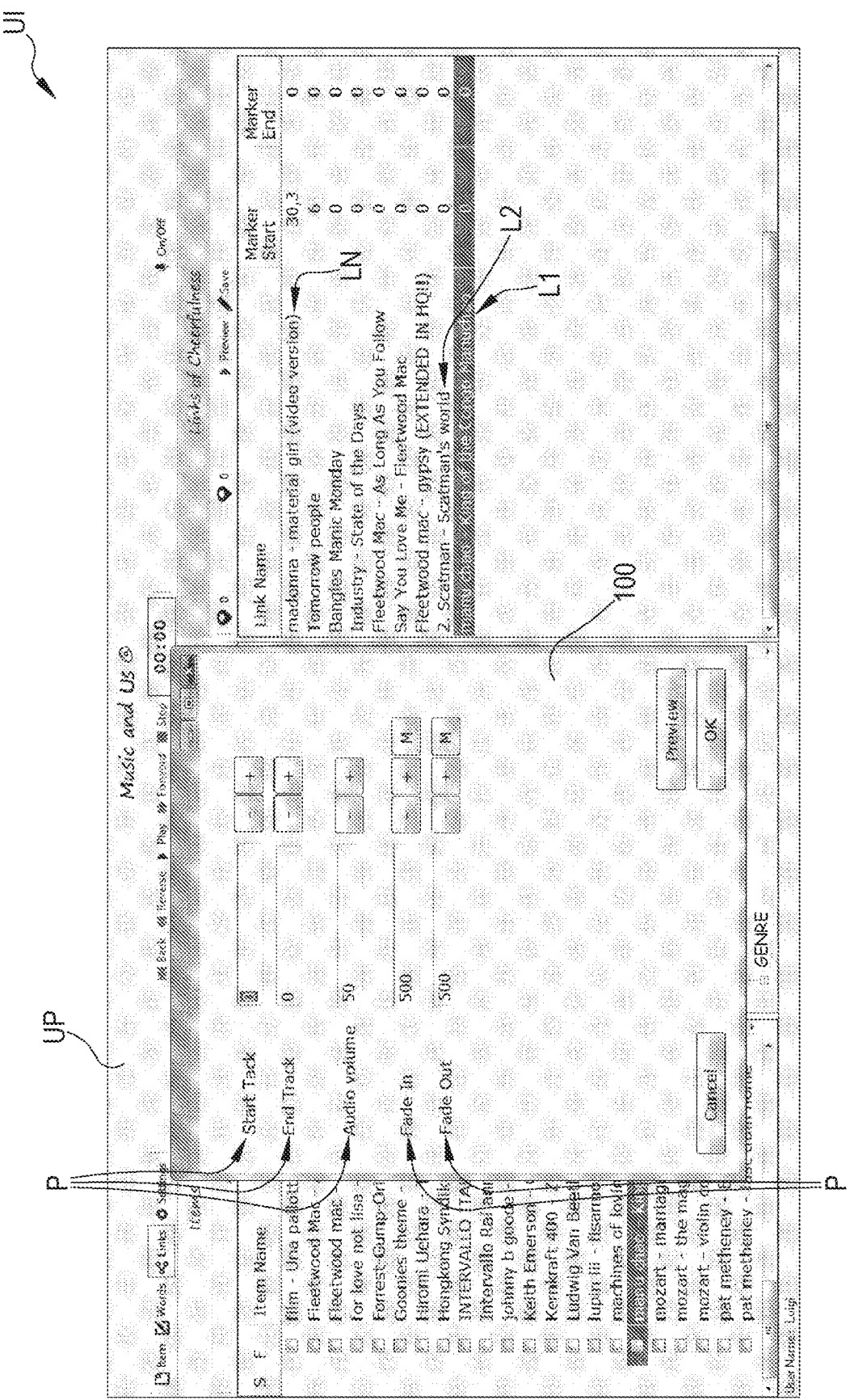

FIG. 15 illustrates the dialogue interface (or dialogue window or mask) 100 after selecting the "Edit" option in FIG. 14; the figure shows that such interface makes it possible to modify the playback parameters P of the link object L1. From the viewpoint of a user operating on the user interface UI of the software S, the keywords can have a specific meaning and for instance describe emotions, moods, uses, activities, situations, and whatever is possibly meaningful and/or worth for a user to associate with those given audio files. As a function of the customized associations and of the keywords, it is subsequently possible to set and control a customizable playback of audio files. Furthermore, a user can set the file playback mode through the user interface UI, for instance in accordance with one or several of the following playback parameters P: fade-in of a multimedia file at the start of the playback of the multimedia file, fade-out of a multimedia file at the end of the playback of the multimedia file, inhibiting the playback of the multimedia file, iterating the playback of a multimedia file, playback sequence with respect to one or several further multimedia files, controlled playback of a multimedia file following or preceding another given multimedia file, controlled playback for a time fraction whose time duration does not exceed the playback duration of the multimedia file, start of playback of a multimedia file at a given portion or instant in time of the multimedia file, end of playing of a multimedia file at a given portion or instant in time of the multimedia file. The management of the audio file playback can be performed by basically or exclusively using voice controls.

Figure 17:
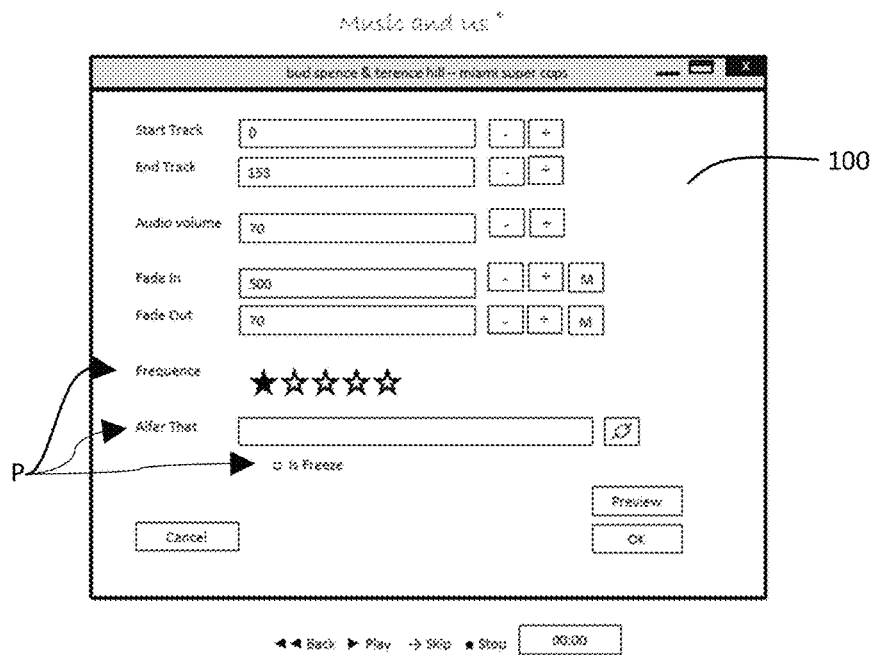
FIG. 17 represents an operating configuration of a dialogue interface of a processor software according to an embodiment.

FIG. 17 also illustrates some further playback parameters P which can be set by a user; one of these playback parameters allows to manage the playback frequency (parameter referred to as "frequence" in the figure), another playback parameter P (parameter referred to as "after that" in the figure) allows to set the playback of a given audio file (or of a given playback management object W, L, linked to an audio file, for instance a link object L), be performed immediately after playing another given audio file (or immediately after playing a playback management object W, L linked to an audio file, for instance a link object L). FIG. 17 also illustrates a further playback parameter (parameter referred to as "is freeze" in the figure), which allows to inhibit the playback of an audio file within an audio file playback sequence. Such playback parameters P are configured to manage the playback of audio files within a semi-random audio file playback sequence.

In other words, in general, such playback parameters P make it possible to configure the non-random or configurable playback settings which are subsequently executed in the semi-random playback modes. The semi-random playback modes make it possible to play multimedia files (preferably audio files) in accordance with settings selected by a user (by said playback parameters P) and random playback settings managed by the software S by default via the playback counter, as previously described. In this way, the software S supports the possibility of playback multimedia files F1, F2, FN in accordance with that which can be called an "intelligent random" mode, which will be detailed below. In practice, with reference to the audio file playback management, as a function of the customized associations (link objects), of the keywords (grouping objects), of the thematic groupings, and of the category objects it is possible to set and control a customizable random playback of audio files (or semi-random playback mode). In the present text, by semi-random playback mode we mean a mode having a file-to-play selection component of a random type, managed through a random number generator of a type known by itself, in conjunction with a configurable or customizable component which allows to set additional conditions which are applied at the same time as the random generation. Therefore such playback is not completely managed in a random way (it is not completely "random") but it is basically an "intelligent random" one, i.e. it is an audio file playback configurable by a user via the software S according to one or several playback parameters P settable for the playback management objects, for instance for the customized associations, for the keywords and/or for the thematic groupings. In practice a user can set, via the user interface UI, a number of rules or playback parameters P, and in particular he/she can: increase or decrease the playback frequency of one or several customized associations, specify that, after a given customized association be played, another given customized association be always followed ("after that"), specify that a given customized association be not played until receiving a contrary instruction ("freeze" or inhibition of playback the audio file linked to the customized association). Such playback parameters P can also be set for the grouping objects (keywords) or for the thematic groupings. Furthermore, a user can set the "intelligent random" via the user interface UI in accordance with one or several of the following playback parameters P: fade-in of a multimedia file at the start of playback of the multimedia file, fade-out of a multimedia file at the end of playback of the multimedia file, inhibiting the playback of the multimedia file, iterating the playback of the multimedia files, playback sequence with respect to one or several further multimedia files, controlled playback of a multimedia file following or preceding another given multimedia file, controlled playback for a time fraction whose playback duration does not exceed the time of the multimedia file, start of playback of a multimedia file at a given portion or instant in time of the multimedia file, end of playback of a multimedia file at a given portion or instant in time of the multimedia file. In other words, in this operating step whereby the type of "intelligent random" playback type is set, a user instructs the software S (for instance on the basis of his/her own tastes and/or sensitivity) with respect to the rules that he/she shall follow upon playing the multimedia files. Such customizable random playback manages the audio files by using the customized associations and the keywords associated therewith. Furthermore, the software S allows to control in real time a number of further parameters related to the execution of the audio files.

In general, when generating customized associations, keywords, and links to the audio files (basically in the previously described operating steps 1 and 2 of the method) a user instructs the software S about the relationship between our music and the user himself/herself; it is basically a preparatory step to the true use. In the operating step following the preparatory step, a user manages, via the user interface UI and by the processor PM, the execution of audio files by controlling the playback of the desired music in a given instant in time (for instance the music that best associates with the user's mood in that instant in time) by basically using the created keywords. For instance, some keywords can include terms like "emotions", "force", "energy", "love", "running", "dance", etc. In practice, the set of the keywords created by a user can constitute a complete conceptual map describing the music tastes of the user himself/herself and in particular describing the music preferences of the user with respect to given situations or activities. As previously said, the keywords are grouping objects W and the term that characterizes and identifies such keywords corresponds to the identification element I of the grouping objects W.

Operationally wise, an example of the operating step following the preparatory step consists of the following situation: a user feels that he/she needs "force" in a moment when he/she feels weak and then he/she uses the "force" keyword to instruct the software S to play multimedia files linked to the "force" keyword. The software S consequently manages the playback of the audio files linked to the "force" keyword in accordance with the playback parameters P of the grouping object W consisting in this case of the "force" keyword and with the specific modes set for the customized associations between the audio files and the "force" keyword (i.e. in accordance with the playback parameters P of the link objects L linking their respective audio files to the grouping object W consisting in this case of the "force" keyword). In practice a user, as a function of his/her feelings or emotions, can decide that selecting a given keyword for playing (hence the subsequent playback of the audio files linked to that keyword) is more suitable than another one in the light of the specific situation he/she is living or of the sensations he/she is feeling in a given instant in time. A user can also decide what is the keyword most suitable to select as a function of the activity he/she is performing or is going to perform. For instance, a user starts running and selects the "running" word and the software S (for instance installed in a mobile device 202) starts playing the audio files the user previously linked to the "running" keyword in the specific modes how the customized associations have been set. Subsequently, for instance while the user is running and while the audio files linked to the "running" keyword are being played, the user himself/herself can enter, for instance by voice or by a manual selection through the user interface UI, a "fast running" control (a further keyword) and consequently the software S plays the audio files associates with "fast running". Concerning the playback parameters P of such keywords, the "running" keyword possibly comprises, for instance, a playback speed set to a first value, whereas the "fast running" keyword possibly comprises a playback speed set to a second value higher than the first value. The customized associations that link each individual audio file to one or both said keywords can for instance specify that a given audio file, like the first audio file that is played against a keyword, be played with a volume or a speed or a playback frequency that gradually increases from the beginning to the end of the playback of the audio file (so as to correspond to a gradual initial warm up condition of the user or to a progressively increasing effort of the user). As an alternative to a manual selection of the "fast running" keyword by the user, it can be performed automatically by the software S upon occurrence of a given condition, for instance a time-based condition. Just as an example of such time-base condition, the software S might operate in such a way that the audio files linked to the "running" keyword be played for 30 minutes and subsequently the audio files linked to the "fast running" keyword be played for 10 minutes; the playback of such keywords can be preceded or followed by the playback of other keywords for instance "breathing" (corresponding to less effort or rest conditions of the user). In this way, by sequentially playing pre-set keywords, the software S can also give instructions to the user who is using it about the activity he/she is performing or about how should it be performed. Such keyword sequential playback mode, also referred to as "chain words", corresponds to a general sequential keyword playback mode implementable by the software S and can for instance be managed by a thematic grouping T of the previously described type. FIG. 10 illustrates a thematic grouping T provided with an identification element I and linked to a plurality of grouping objects W1, W2, WN. For instance, a thematic grouping T can be provided, whose identification element I is "complete running cycle". Such "complete running cycle" thematic grouping can be linked to a plurality of keywords, including "running", "fast running", and "breathing", and can be configured to manage a chain of keywords including, as an example, the following playing of "breathing" for 5 minutes, the playback of "running" for 30 minutes, the playback of "fast running" for 10 minutes, and finally the playback of "breathing" for 5 minutes. In this event, the thematic grouping T comprises the playback parameter P corresponding to the keyword playback sequence.

In other words, even in the light of the above examples, the identification element might correspond to a condition, at the occurrence of which a user decides whether to play the audio files associated therewith and the customized associations linking such keyword to its respective multimedia files corresponding, via their playback parameters P, to a plurality of detailed instructions for the software S about the specific audio track playback mode. The set of the keywords and of the customized associations between audio files and keywords of each user can be backed-up through the user interface UI of the software S and can be stored in a respective user profile UP, which in this case also operates as a memory. Furthermore, in such user profile UP the settings relevant to the thematic groupings T and to the category objects C can be backed-up. Therefore, the user profile UP represents a source of information about the specific and unique relationship between music and that specific user. A user profile UP or a music library organized by keywords and customized associations can also be shared by other users, for instance within a user network. Thanks to such sharing, a user provides another user or a plurality of other users or all users of the user network (as a function of the sharing options of the software S which can be for instance selected through the user interface UI) with information concerning the specific relationship existing between music (the audio files) and the user himself/herself. In practice, whenever a user profile UP or a music library is shared, the user who controls the sharing exhibits what that music communicates to himself/herself, what emotions are transmitted to him/her, when and how he/she listens to them, etc. Furthermore the software S can support the creation of an additional user profile UP or of an additional music library; the additional user profile UP or the additional music library can be configured to be subsequently sent to another user. Such additional user profile UP or additional music library can, before being sent, be configured as a function of the tastes, experiences, feelings, sensitivity, etc. of the user who is to receive it, so as to represent a dedicated and tailored gift for the recipient user. In other words, the keywords constitute true communication channels which transmit personal, mood, sentimental, relational, and/or character information of a user to one or several other users.

Advantageously, as previously detailed, is the software in accordance with to the concepts herein configured to involve users in creating a music library and in managing the playback of the audio files of the music library. Such aspect is particularly advantageous in that it is the user who decides which are the playback "music path" the software shall follow through the setting of the customized associations, of the keywords, and/or of the thematic groupings and of its respective sequence. In other words, the software always operates within the boundaries of the rules, of the audio files, and of the music paths set by the user. This is possible because, advantageously, a user interacts with the software to set the customized associations, the keywords, and the thematic groupings in an operating step preceding the playback of the audio files. In practice, a user selects a keyword or a thematic grouping T or a category object C with the purpose of making the software play the file audio linked thereto and he/she does not need to manage the playback during the execution of the audio files, in that he/she already previously set the rules and the music paths the software shall follow.

The concepts herein allow to achieve one or several of the following advantages and to solve one or several of the problems encountered in the known art. First of all, the concepts herein make it possible to increase and optimize the multimedia file playback modes. Furthermore, the method and the processor software according to the concepts herein make it possible to manage and play multimedia files in accordance with a simple, rational, and intuitive logic. The software according to the concepts herein makes it possible a multimedia file playback management that can be set in a simple manner, for instance by a user through a selection of the playback parameters, and be automatically managed by the software itself. The software and the method according to the concepts herein, which support playback setting that are not random or configurable (for instance by setting playback parameters) and random playback settings (for instance by taking advantage of the default logic of the software), make it possible to manage the playback of multimedia files in accordance with one or several semi-random playback modes. Such semi-random playback modes offer a various and pleasant multimedia file playing experience to users. The software and the method according to the concepts herein also make it possible to customize multimedia files playback management, by making it configurable by an individual user as a function of his/her needs. Furthermore, the system according to the concepts herein makes it possible to optimize the multimedia file playback management, for instance through the update of the playback counter.

Furthermore, the claimed solution is easy to use, easy to implement, and simple and economical to realize.

The invention claimed is:

1. A method for managing files, in particular multimedia files, comprising:
   generating, by a computer, at least one playback management object for managing playback of multimedia files via a user interface of the computer, the playback management object comprising at least one multimedia file playback parameter, wherein the at least one multimedia file playback parameter is selected in a following list: playback speed, playback frequency, playback volume, fade-in of a multimedia file at a start of the playback of the multimedia files, and fade-out of the multimedia file at an end of the playback of the multimedia files, the generating of the at least one playback management object comprises at least an operating step whereby the at least one multimedia file playback parameter is generated, wherein the managing of the playback of the multimedia files via the user interface comprises:
   defining, by the computer, at least one playback counter of one or several multimedia files linked to the playback management object, the playback counter being configured to be automatically updated for time period following an integral or partial playback of the multimedia file within a semi-random playback sequence, to take account of the playback having been performed in response to user's selection of the one or serval multimedia files via the user interface;
   querying, by the computer, the playback counter of the one or several multimedia files linked to the playback management object in order to check whether the multimedia file has already been played within a predetermined number of times; and
   playing or temporarily inhibiting the playback of the one or several multimedia files within a semi-random playback mode in a way correlated to a result of the querying relevant to a value assumed by the playback counter;
   generating, by the computer, at least one link between the playback management object and at least a first multimedia file of the playback of the one or several multimedia files; and
   storing, by the computer, the at least one playback management object and the link in a memory.

2. The method according to claim 1, also comprising:
   an operating step whereby at least a first multimedia file, or a plurality of multimedia files, are played as a function of at least one playback parameter of said playback management object, or as a function of a plurality of playback parameters of said playback management object or a corresponding plurality of playback management objects; and/or
   an operating step whereby one or several multimedia files are played as a function of said at least one playback parameter of said at least one playback management object in accordance with one or several semi-random playback modes,
   wherein the one or more several semi-random playback modes comprising both random playback settings and non-random playback settings, and/or configurable playback settings, and/or playback settings correlated to said playback parameter or to a plurality of said playback parameters, and/or
   wherein said playback management object is configured to play, via one or several of said links, a plurality of multimedia files in accordance with one or several of semi-random playback modes comprising both random playback setting and non-random playback settings and/or configurable playback settings and/or playback settings correlated to said playback parameter or to a plurality of said playback parameters.

3. The method according to the claim 2, wherein said at least one playback management object is configured, by setting an appropriate playback parameter, to manage a configurable multimedia file playback sequence and/or to set a correlation in a playback order between two or several multimedia files in a semi-random playback sequence of multimedia files and/or to inhibit playback of a plurality of multimedia files within a playback sequence of multimedia files or within a semi-random playback sequence of multimedia files and/or wherein said playback management object is a grouping object configured to manage the playback of a plurality of multimedia files.

4. The method according to claim 1, comprising an operating step whereby the playback frequency of a multimedia file within one or several sequences of semi-random playback or of a playback management object is increased or decreased, wherein the playback frequency of a multimedia file or of a playback management object is increased or decreased is performed by setting or assigning a playback parameter or repetition indicator to the multimedia file or to the playback management object, said playback parameter or repetition indicator being configured to make multiple playback of a multimedia file within a semi-random playback sequence or to temporarily inhibit the multiple playback of a multimedia file within said semi-random playback sequence.

5. The method according to claim 1, comprising an operating step whereby the playback of one or several multimedia files or of one or several playback management objects, for instance one or several link objects, within a semi-random playback sequence is inhibited, inhibit operating step being performed by setting an appropriate multimedia file playback parameter of a playback management object.

6. The method according to claim 1, wherein the method comprises an operating step whereby, by an appropriate multimedia file playback parameter of a playback management object, playback of a given multimedia file and/or of a given playback management object linked to a multimedia file, for a link object, is set to be performed in a way correlated to, or immediately after, playback of another given multimedia file or of another given playback management object.

7. The method according to claim 1, wherein the playback management object also comprises one identification element and wherein operating step whereby at least one playback management object is generated also comprises an operating step whereby the identification element is generated.

8. The method according to claim 1, wherein said playback management object comprises a plurality of playback parameters of multimedia files, operating step whereby at least one playback management object is generated also comprising an operating step whereby said plurality of playback parameters of multimedia files is generated.

9. The method according to claim 1, wherein the method comprises: generating a plurality of playback management objects; generating at least one link between each playback management object of said playback management objects and at least a respective first multimedia file; and storing said plurality of playback management objects and/or links in a memory.

10. A The method according to claim 1, wherein the method comprises an operating step whereby one or several multimedia files is played as a function of said playback management object and of said at least one playback parameter of said playback management object and wherein the method comprises an operating step whereby a plurality of links between said playback management object and a corresponding plurality of multimedia files is generated and/or wherein said playback management object is a grouping object configured to manage playback of a plurality of multimedia.

11. The method according to the claim 10, wherein each link comprises a link object for managing playback of one or several multimedia files, each playback management link object comprising at least one auxiliary identification element and at least one auxiliary playback parameter of multimedia files, at least one link between said playback management object and at least a first multimedia file is generated, wherein the generating of the link between the playback management object and the at least the first multimedia the comprises an operating step whereby said link object is generated, an operating step whereby at least said auxiliary identification element is generated and an operating step whereby said auxiliary playback parameter of multimedia files is generated.

12. The method according to claim 10, comprising generating at least one grouping object configured to manage a plurality of multimedia files; and generating a plurality of link objects between said grouping object and a corresponding plurality of multimedia files.

13. The method according to claim 1, wherein the operating step whereby at least one playback management object of one or several multimedia files is generated comprises an operating step whereby one or several link objects is/are generated, each link object being configured to manage the playback of one individual respective multimedia file, the method also comprising:
  generating at least one grouping object for said link objects, the at least one grouping object comprising at least one identification element;
  generating a plurality of grouping links between the grouping object and the link objects, wherein said grouping object is a further multimedia the playback management object and comprises one further playback parameter, wherein at least one grouping object for said playback management objects of one or several multimedia files is generated also comprising an operating step whereby said identification element and said further playback parameter are generated.

14. A software being stored in a memory and being installed in a local computer or being installed in a mobile device or being installed in a remote server and being accessible through a computer network, via the world wide web or by an internet page, the software configured to perform operating steps comprising:
  generating, by a computer, at least one playback management object for managing playback of multimedia files via a user interface of the computer, the at least one playback management object comprising at least one multimedia file playback parameter, wherein the at least one multimedia the playback parameter is selected in a following list: playback speed, playback frequency, playback volume, fade-in of a multimedia file at a start of the playback of the multimedia files, and fade-out of the multimedia file at an end of the playback of the multimedia files, the generating of the at least one playback management object comprises at least an operating step whereby the at least one multimedia file playback parameter is generated, wherein the managing of the playback of the multimedia files via the user interface comprises:
  defining, by the computer, at least one playback counter of one or several multimedia files inked to the at least one playback management object, the at least one playback counter being configured to be automatically updated for time period following an integral or partial playback of the multimedia file within a semi-random playback sequence, to take account of the playback having been performed in response to user's selection of the one or serval multimedia files via the user interface;
  querying, by the computer, the playback counter of the one or several multimedia files linked to the at least one playback management object in order to check whether the multimedia file has already been played within a predetermined number of times; and
  playing or temporarily inhibiting the playback of the one or several multimedia files within a semi-random playback mode in a way correlated to a result of the querying relevant to a value assumed by the playback counter;
  generating, by the computer, at least one link between the at least one playback management object and at least a first multimedia file of the playback of the one or several multimedia files; and
  storing, by the computer, the at least one playback management object and the link in a memory.

15. The software, according to claim 14, further comprising: at least one playback management object of one or several multimedia files, said at least one playback management object comprising at least one playback parameter of multimedia files and, optionally, at least one identification element, the generating of the at least one playback management object comprising at least an operating step whereby said at least one playback parameter of multimedia files is generated and, optionally, an operating step whereby said identification element is generated.

16. A method for managing files in particular multimedia files, comprising:
  generating, by a computer, at least one playback management object for managing playback of multimedia files via a user interface of the computer, the at least one playback management object comprising at least one multimedia the playback parameter, wherein the generating of the at least one playback management object comprises least an operating step whereby the at least one multimedia the playback parameter is generated, wherein the managing of the playback of the multimedia files via the user interface comprises:

defining, by the computer, at least one playback counter of one or several multimedia files linked to the at least one playback management object, the at least one playback counter being configured to be automatically updated for time period following an integral or partial playback of a multimedia file within a semi-random playback sequence, to take account of the playback having been performed in response to user's selection of the one or serval multimedia files via the user interface;

querying, by the computer, the at least one playback counter of the one or several multimedia files linked to the at least one playback management object in order to check whether the multimedia file has already been played within a predetermined number of times; and playing or temporarily inhibiting the playback of the one or several multimedia files within a semi-random playback mode in a way correlated to a result of the querying relevant to a value assumed by the at least one playback counter;

generating, by the computer, at least one link between the at least one playback management object and at least a first multimedia file of the playback of the one or several multimedia files; and storing, by the computer, at least one playback management object and link in a memory, wherein the multimedia file playback parameter is selected in a following list: playback speed, playback frequency, playback volume, fade-in of the multimedia file at a start of the playback of the multimedia files, fade-out of the multimedia file at an end of the playback of the multimedia files, inhibition of a multimedia file playback, iteration of a multimedia file playback, playback sequence with respect to the one or several multimedia files, controlled playback of the multimedia file following or preceding another given multimedia file, controlled playback for a time fraction not exceeding a duration of a multimedia file playback, start of a multimedia file playback at a given portion or instant of the multimedia file, end of a multimedia file playback at a given portion or instant of the multimedia file.

17. The method according to claim 16, wherein each link comprises a link object for managing the playback of one or several multimedia files, each playback management link object comprising at least one auxiliary identification element and at least one auxiliary playback parameter of multimedia files, wherein the generating of at least one link between said playback management object and at least a first multimedia file comprising an operating step whereby said link object is generated, an operating step whereby at least said auxiliary identification element is generated and an operating step whereby said auxiliary playback parameter of multimedia files is generated.

18. The method according to claim 16, comprising generating a plurality of said playback management objects; generating at least one link between each playback management object of said playback management objects and at least a respective first multimedia the; and storing said plurality of playback management objects and/or links in a memory.

\* \* \* \* \*